(12) United States Patent
Poisner

(10) Patent No.: US 9,565,409 B2
(45) Date of Patent: Feb. 7, 2017

(54) TECHNOLOGIES FOR PROJECTING A NONCONTINUOUS IMAGE

(71) Applicant: Intel Corporation, Santa Clara, CA (US)

(72) Inventor: David Poisner, Carmichael, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/750,934

(22) Filed: Jun. 25, 2015

(65) Prior Publication Data

US 2016/0381334 A1    Dec. 29, 2016

(51) Int. Cl.
*H04N 9/31* (2006.01)
*H04N 3/22* (2006.01)
*H04N 3/223* (2006.01)
*G06T 7/00* (2006.01)
*G06K 9/46* (2006.01)

(52) U.S. Cl.
CPC .......... *H04N 9/3194* (2013.01); *G06K 9/4604* (2013.01); *G06T 7/0085* (2013.01); *H04N 9/3185* (2013.01); *G06K 2009/4666* (2013.01)

(58) Field of Classification Search
CPC ...... H04N 9/31; H04N 9/3185; H04N 9/3188; H04N 9/3197; H04N 5/74; H04N 3/22; H04N 3/223; H04N 3/23; G06T 5/001; G06T 5/006; G06T 11/60; G06T 3/00
USPC .......................... 348/744–747, 806; 382/275
IPC ................... H04N 9/31, 5/74, 3/22, 3/223, 3/23
See application file for complete search history.

(56) References Cited

U.S. PATENT DOCUMENTS

2004/0036813 A1* 2/2004 Matsuda ................. H04N 5/74
                                                            348/745
2011/0128454 A1* 6/2011 Yasuda ................ H04N 9/3197
                                                            348/744

* cited by examiner

*Primary Examiner* — Sherrie Hsia
(74) *Attorney, Agent, or Firm* — Barnes & Thornburg LLP

(57) ABSTRACT

Technologies for projecting a noncontinuous image onto at least a portion of a projection region using a projector of a projection device. The projection device is configured to determine one or more cut-out areas of the projection region. Each cut-out area defines an area within the projection region on which a corresponding portion of the image is not to be projected by the projector of the projection device. The projection device is further configured to update the projection region based on the cut-out area(s) and project, via the projector, the image onto the updated projection region, wherein no portion of the image is projected on cut-out area(s). Other embodiments are described and claimed.

25 Claims, 13 Drawing Sheets

TECHNOLOGIES FOR PROJECTING A NONCONTINUOUS IMAGE

BACKGROUND

Digital projectors are typically used to project an image onto a flat surface, such as a wall or screen, using a rectangular aspect ratio from a perpendicular angle. However, under certain conditions, the image may be projected onto a surface that is not flat (e.g., curved, angled, etc.). Additionally, the image may be projected onto the surface at a non-perpendicular angle relative to the projector. Accordingly, some projectors are configured to compensate for such surfaces, such as by use of keystone correction (i.e., skewing the image), thereby making the image rectangular. Depending on the environment in which the projector is being used, any number of objects may interfere with the projection of the image, effectively disrupting the view of the image. In other words, the image may not be accurately displayed onto the projected surface, due to the obstructive objects interfering with the projection of the image.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
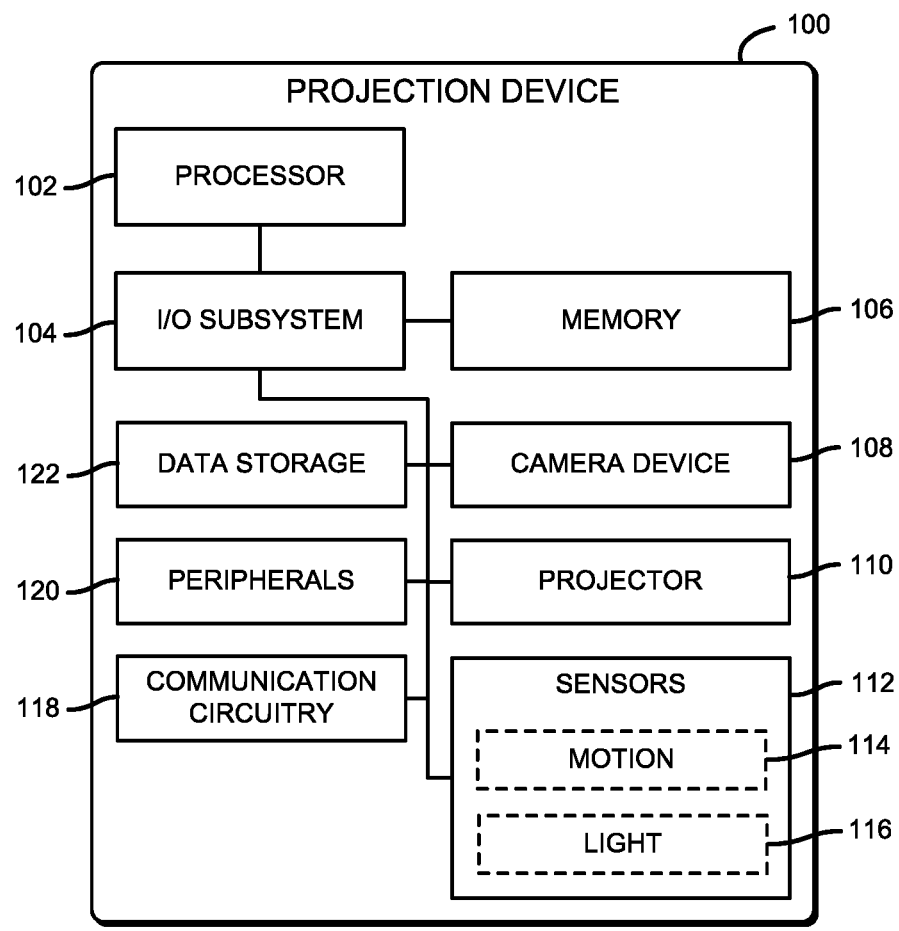
FIG. 1 is a simplified block diagram of at least one embodiment of a projection device for projecting an image that includes a camera and a projector.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a projection device 100 for projecting an image includes a camera device 108 and a projector 110. In use, the projection device 100 is configured to display an image, via the projector 110, onto a portion of a surface (i.e., a projection region). It should be appreciated that the surface may not be flat. In other words, the surface may include various curves, angles, and/or objects that may obstruct the image from being displayed correctly. For example, in some embodiments, the surface may include a portion of a floor, a wall, and/or a ceiling of a structure (e.g., a room). Additionally, in some embodiments, the projection region may include a surface (e.g., top and/or side) of one or more of the objects that may otherwise obstruct the image from being displayed correctly. Accordingly, in an initialization phase prior to displaying the image, the projection device 100 performs a depth scan, using the camera device 108, on the projection region to generate a 3-dimensional (3D) model of the projection region.

Additionally, the projection device 100 determines a boundary of the projection region based on the depth scan. The boundary of the projection region is restricted by a field of view (FOV) of the projector 110. Accordingly, the depth scan may only be performed on the FOV of the projector 110. In some embodiments, the boundary may be adjusted automatically based on the various curves, angles, and/or objects identified by the depth scan. Additionally or alternatively, the boundary may be adjusted manually using a boundary defining object as discussed in more detail below. Further, the projection device 100 is configured to enable a user of the projection device 100 to designate one or more cut-out areas within the projection region. Each cut-out area designates a portion of the projection region (e.g., a bed) on which the projector 110 is not to project a portion of the image corresponding to the cut-out area. In other words, the projector 110 does not emit light to the portions of the projection region identified as cut-out areas. It should be appreciated that, in some embodiments, some amount of light may be emitted to the portions of the projection region identified as cut-out areas. Such light may be emitted due to flaws of the projector 110 (e.g., leakage) and/or particular curvature or angles of the projection region border. In such embodiments, the projector 110 may emit substantially no light to the portions of the projection region identified as cut-out areas.

Within the portions of the projection region that are not cut-out areas (i.e., designated as areas to display the image), the projection device 100 is further configured to enable a user of the projection device 100 to designate one or more action areas. The action areas identify one or more areas of interest within the projection region in which images are to be projected based on a set of predetermined environment conditions (i.e., triggers). The environment conditions may be embodied as one or more conditions of the local environment in which the projection device 100 is located, such as a time of day, a detected amount of light, a detected motion, a detected level of noise, a detected temperature level, a detected level of a particulate matter (e.g., particles of combustion), etc.

Figure 10:
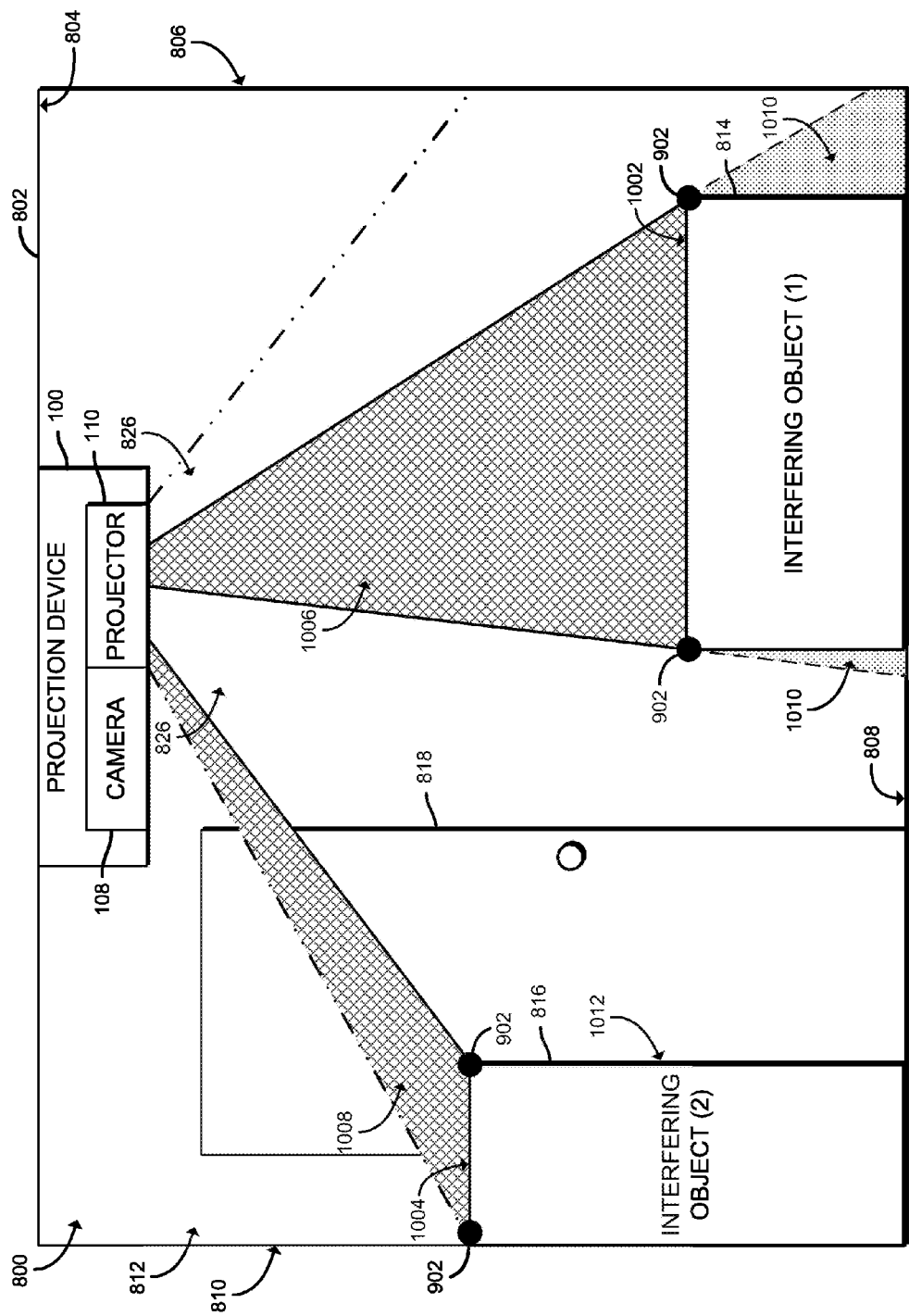
FIG. 10 is another simplified elevational view of the projection device of FIG. 8 showing the updated projection region illustrated in FIG. 9 including defined cut-out areas.

For example, in an embodiment wherein the projection device 100 is mounted in a room such that at least a portion of the projection region is defined as an available projection region between a bed in the room and a door in the room. Accordingly, a portion of the projection region defined as an available projection region can be designated as an action area to display a selected image (e.g., a path with footprints from the bed to the door as shown in FIG. 10) when certain environment conditions are met. In another example, as a result of the 3D model generated by the depth scan, a portion of a wall adjacent to the bed in the room may be designated as a location for an image (e.g., an avatar) to be displayed on the wall to "interact" with an occupant of the bed when certain environment conditions are met, such as by "checking" under the bed for monsters in response to certain environment conditions.

In some embodiments, an object (e.g., a toy, a piece of a game, an article of clothing, etc.) may be designated and/or identifiable as an action area. Accordingly, it should be appreciated that the object may define a boundary of the action area, such that the object serves as a single boundary defining object. In such embodiments, the object may be detectable via a scan to determine a location relative to the projection area, such that the object can be illuminated by the projection device 100 when certain conditions associated with the action area (i.e., the object) are triggered. The object may include one or more characteristics (e.g., color, shape, wireless communication capabilities, etc.) that make a location of the object discernable to the projection device, such as via a scan.

The projection device 100 may be embodied as any type of computing device capable of projecting an image, or a video (i.e., a temporal sequence of images), onto a surface, such as a digital light processing (DLP) projector, a liquid crystal display (LCD) projector, a light emitting diode (LED) projector, a cathode ray tube (CRT) projector, a handheld projector, (i.e., a pico projector), and/or any type of video projection device capable of performing the functions described herein. It should be appreciated that, in some embodiments, the projection device 100 may be incorporated into another computing device, such as a smartphone, a tablet computer, a laptop computer, a notebook computer, a consumer electronic device, and/or any other type of mobile computing device. It should be further appreciated that, in some embodiments, an external computing device (not shown) (e.g., a smartphone, a laptop, etc.), may be connected to the projection device 100. In such embodiments, the external computing device may be configured to perform the depth scan and/or run an application that is capable of providing a user interface between the projection device 100 and the user for receiving input from and providing output to the user.

As shown in FIG. 1, the illustrative projection device 100 additionally includes a processor 102, an input/output (I/O) subsystem 104, a memory 106, one or more sensors 112, communication circuitry 118, one or more peripheral devices 120, and a data storage device 122. Of course, the projection device 100 may include other and/or additional and/or alternative components, such as those commonly found in a computing device (e.g., a display, various input/output devices, etc.), in other embodiments. Additionally, in some embodiments, one or more of the illustrative components may be incorporated in, or otherwise form a portion of, another component. For example, the memory 106, or portions thereof, may be incorporated in the processor 102 in some embodiments.

The processor 102 may be embodied as any type of processor capable of performing the functions described herein. For example, the processor 102 may be embodied as a single or multi-core processor(s), digital signal processor, microcontroller, or other processor or processing/controlling circuit. The memory 106 may be embodied as any type of volatile or non-volatile memory or data storage capable of performing the functions described herein. In operation, the memory 106 may store various data and software used during operation of the projection device 100 such as operating systems, applications, programs, libraries, and drivers.

The memory 106 is communicatively coupled to the processor 102 via the I/O subsystem 104, which may be embodied as circuitry and/or components to facilitate input/output operations with the processor 102, the memory 106, and other components of the projection device 100. For example, the I/O subsystem 104 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 104 may form a portion of a system-on-a-chip (SoC) and be incorporated, along with the processor 102, the memory 106, and other components of the projection device 100, on a single integrated circuit chip.

The camera device 108 may be embodied as any type of image capturing device that includes software, hardware, circuitry, or a combination thereof capable of enabling images to be captured, transmitted into signals, and processed to generate a 3D model for a surface within a field of view (FOV) of the camera device 108. For example, in one such embodiment, the camera device 108 may be an Intel® RealSense™ 3D camera with depth-sensing technologies for generating the 3D model of the surface. The camera device 108 may be configured to use any image formatting technologies for capturing raw image data and storing the raw data as compressed and/or uncompressed still photograph files and/or video files using various digital format technologies and containers to a file on the projection device 100 (e.g., the data storage device 122).

In some embodiments, the camera device 108 may include multiple image sensors (not shown), or an image sensor array, wherein each of the image sensors may be capable of capturing light and converting the captured light into electrical signals to be processed into images from which a 3D model of the surface can be generated. In such embodiments, one or more of the image sensors may be embodied as or otherwise include one or more charge-coupled device (CCD) image sensors, complementary metal-oxide-semiconductor (CMOS) image sensors, and/or any type of image sensor capable of performing the functions described herein. It should be appreciated that, in some embodiments, the camera device 108 may include various other devices (e.g., an infrared (IR) projector, an IR sensor, etc.) such that the other devices can estimate depth values of objects in the FOV by analyzing a light pattern projected on the surface of the FOV.

The projector 110 may be embodied as any type of image projecting device that includes software, hardware, circuitry, or a combination thereof capable of projecting an image onto a surface within a FOV of the projector 110. It should be appreciated that the projector 110 may use any type of technology for projecting the image, including transmissive or reflective technologies, such as DLP, LCD, LED, CRT, and/or any other type of projection technology. Accordingly, the projector 110 may include additional components not illustrated in FIG. 1 (e.g., a lens, lasers, etc.) for clarity of the description.

The illustrative sensors 112 may include any type of sensor capable of generating sensor data including, but not limited to, acoustic sensors, temperature sensors, proximity sensors, and/or other types of sensors. In the illustrative embodiment, the sensors 112 include a motion sensor 114 and a light sensor 116. The motion sensor 114 may be embodied as any type of motion detecting sensor(s) capable of detecting a motion in a vicinity of the projection device 100. For example, in some embodiments, the motion sensor 114 may include an optical sensor, a microwave sensor, and/or an acoustic sensor. It should be appreciated that the motion sensor 114 may use any type of motion technology to detect motion proximate to the projection device 100, such as passive IR, microwave, ultrasonic, radio wave, and/or software-based detection using images captured from the camera device 108. The light sensor 116 may be embodied as any type of photosensor, or photodetector, capable of sensing light and/or other electromagnetic energy.

The communication circuitry 118 may be embodied as any communication circuit, device, or collection thereof, capable of enabling communications between the projection device 100 and a remote computing device (not shown). The communication circuitry 118 may be configured to use any one or more communication technologies (e.g., wired or wireless communication technologies) and associated protocols (e.g., Ethernet, Bluetooth®, Wi-Fi®, WiMAX, USB, etc.) to effect such communication.

The peripheral devices 120 may include any number of input/output devices, interface devices, and/or other peripheral devices. For example, in some embodiments, the peripheral devices 120 may include a display, touch screen, graphics circuitry, keypad, keyboard, mouse, speaker system, and/or other input/output devices, interface devices, and/or peripheral devices. Additionally or alternatively, the peripheral devices 120 may include one or more ports, such as a USB port, for example, for connecting external peripheral devices to the projection device 100.

The data storage device 122 may be embodied as any type of device or devices configured for short-term or long-term storage of data such as, for example, memory devices and circuits, memory cards, hard disk drives, solid-state drives, or other data storage devices. In use, as described below, the data storage device 122 may store data of the projection region of the projector 110, such as the 3D model or other, similar data, as well as data related to the designated cut-out areas and action areas.

Figure 2:
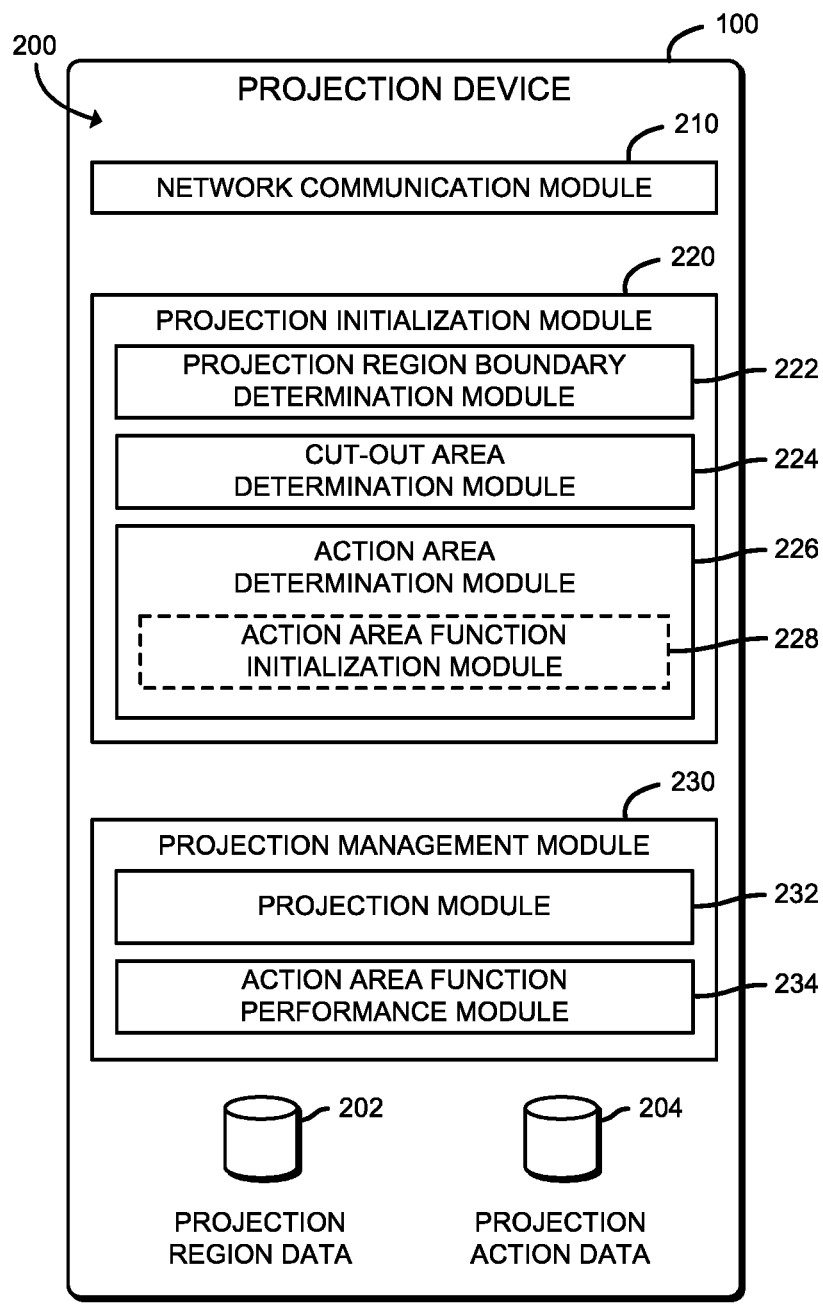
FIG. 2 is a simplified block diagram of at least one embodiment of an environment that may be established by the projection device of FIG. 1.

Referring now to FIG. 2, in an illustrative embodiment, the projection device 100 establishes an environment 200 during operation. The illustrative environment 200 includes a network communication module 210, a projection initialization module 220, and a projection management module 230. Each of the modules, logic, and other components of the environment 200 may be embodied as hardware, software, firmware, or a combination thereof. For example, each of the modules, logic, and other components of the environment 200 may form a portion of, or otherwise be established by, the processor 102 or other hardware components of the projection device 100. As such, in some embodiments, one or more of the modules of the environment 200 may be embodied as a circuit or collection of electrical devices (e.g., a network communication circuit, a projection initialization circuit, a projection management circuit, etc.). It should be appreciated that the projection device 100 may include other components, sub-components, modules, sub-modules, and devices commonly found in a projection device, which are not illustrated in FIG. 2 for clarity of the description.

Additionally, the illustrative environment 200 includes projection region data 202 and projection action data 204, each of which may be accessed by one or more of the various modules and/or sub-modules of the projection device 100. The projection region data 202 may include any data indicative of the projection region, such as the 3D model of the projection region produced by the camera device 108. The projection action data 204 may include any data indicative of the action areas to be projected (e.g., boundaries of the action areas, environment conditions that can trigger an action associated with the action areas, the action associated with the action areas, etc.) and any associated functions, as well as the cut-out areas (e.g., boundaries of the cut-out areas).

The network communication module 210 is configured to facilitate network communications between the projection device 100 and a remote computing device (not shown). The remote computing device may be embodied as any type of computing device, such as a smartphone, a laptop, a desktop computing device, or any type of computing device capable of running an application that can communicate with the projection device 100 via the network communication module 210 (e.g., via the communication circuitry 118).

The projection initialization module 220 is configured to initialize a projection region. To do so, the projection initialization module 220 includes a projection region boundary determination module 222, a cut-out area determination module 224, and an action area determination module 226. The projection region boundary determination module 222 is configured to determine a projection region within which cut-out areas and action areas can be defined, as described further below. To do so, the projection region boundary determination module 222 is configured to generate a 3D model of the surface within a FOV of the projector 110 via a depth scan using the camera device 108 of the projection device 100. It should be appreciated that the depth scan may use any depth scanning technology, or range imaging technology, known in the art capable of generating the 3D model, including projected light scanning (e.g., structured light 3D scanning, infrared projection scanning, etc.), time of flight (e.g., radio-frequency (RF) modulated light sources, pulsed-light, range-gated imagers, etc.), image stitching, etc. Further, the projection region boundary determination module 222 is configured to determine any projector settings that may be used to calibrate the projector 110 to accommodate for display of an image on the projection region. Such projector settings may include brightness, contrast, color, tint, sharpness, zoom, magnification, hue, saturation, lens shift, aspect ratio, resolution, and the like. In some embodiments, the projector settings may be determined from the 3D model.

In some embodiments, which will also be described in further detail below, the projection device 100 may automatically detect a projection region using the FOV of the projector 110 of the projection device 100, such as from the 3D scan generated by the camera device 108. Alternatively, a user of the projection device 100 may manually setup the projection region using one or more boundary defining objects (see the boundary defining objects 902 in FIGS. 9-13). Accordingly, in such embodiments, the projection region boundary determination module 222 is further configured to detect the boundary defining objects, such as by a scan of the FOV of the projector 110 using one or more sensors (e.g., the sensors 112) and/or the camera device 108 to detect a location of the boundary defining objects.

The boundary defining objects may be embodied as any type of device that is capable of providing or identifying a location to the projection device 100 and/or that is capable of being detected by the projection device 100 to determine the location of the boundary defining object. For example, in some embodiments, a radio frequency may be emitted by the boundary defining object that is either detectable by the projection device 100 to determine the location or includes data indicative of the location. In another example, in some embodiments, the boundary defining object may be a designated color or shape that a scan using the camera device 108 can detect to determine a location within the projection region, such as may be determined by the projection device 100 using the generated 3D model of the projection region.

It should be appreciated that a single boundary defining object may be used to identify the boundary region. In other words, the perimeter of the single boundary defining object may define the projection region boundary or may provide a reference point from which a circumferential area may be projected to illuminate the boundary defining object. For example, in such embodiments, the single boundary defining object may be a toy, a component of a game, an article of clothing, etc., that is capable of being detected and identified as the single boundary defining object.

The cut-out area determination module 224 is configured to determine a cut-out area within the projection region. Similar to the projection region boundary determination module 222, the cut-out area determination module 224 may detect one or more boundary defining objects (see the boundary defining objects 720 in FIGS. 7-10) to determine a location of the boundary defining objects. Accordingly, the cut-out area determination module 224 is further configured to detect the boundary defining objects, such as by a scan of the FOV of the projector 110 using one or more sensors (e.g., the sensors 112) and/or the camera device 108 to detect a location of the boundary defining objects. As discussed above, each cut-out area defines an area of the projection region on which no image is to be displayed (i.e., no light is to be emitted from the projector 110 to the cut-out areas).

The action area determination module 226 is configured to determine an action area within the display area (i.e., an area within the projection region that is not a cut-out area). Similar to the projection region boundary determination module 222 and the cut-out area determination module 224, the action area determination module 226 may detect one or more boundary defining objects (see the boundary defining objects 720 in FIGS. 7-10), the location of which can be determined by the projection device 100. Accordingly, the action area determination module 226 is further configured to detect the boundary defining objects, such as by a scan of the FOV of the projector 110 using one or more sensors (e.g., the sensors 112) and/or the camera device 108 to detect a location of the boundary defining objects. Additionally, the action area determination module 226 may be configured to receive input (i.e., settings) from a user that corresponds to a function of a defined action area. To do so, the action area determination module 226 may include an action area function initialization module to receive the function settings corresponding to the action to be performed by the projection device 100. For example, the function settings may include an action to take, such as displaying a particular video stream within a defined action area and/or playing back a particular audio file synchronized with the video stream. Additionally or alternatively, the function settings may include one or more environment conditions that may be detected by the projection device 100 to trigger the action, such as a time of day, an illuminance level, an audible level, a verbal command, a motion gesture, etc.

The projection management module 230 is configured to execute the initialized projection regions. To do so, the projection management module 230 includes a projection module 232 and an action area function performance module 234. The projection management module 230 is further configured to project an image onto a portion of the projection region that is not defined as a cut-out area. Accordingly, the projection module 232 is configured to determine an available display area of the projection region (i.e., adjust the projection region) in which an image can be projected based on any cut-out areas. The action area function performance module 234 is configured to enable one or more sensors of the projection device 100 (e.g., the sensors 112) to monitor for action area triggers (e.g., environment conditions) based on the function settings of the enabled action areas. Additionally, the action area function performance module 234 is configured to monitor the enabled sensor(s)

(i.e., receive/retrieve feedback from the enabled sensor(s)) to determine whether certain environment conditions were met to trigger a function of the action area.

Figure 3:
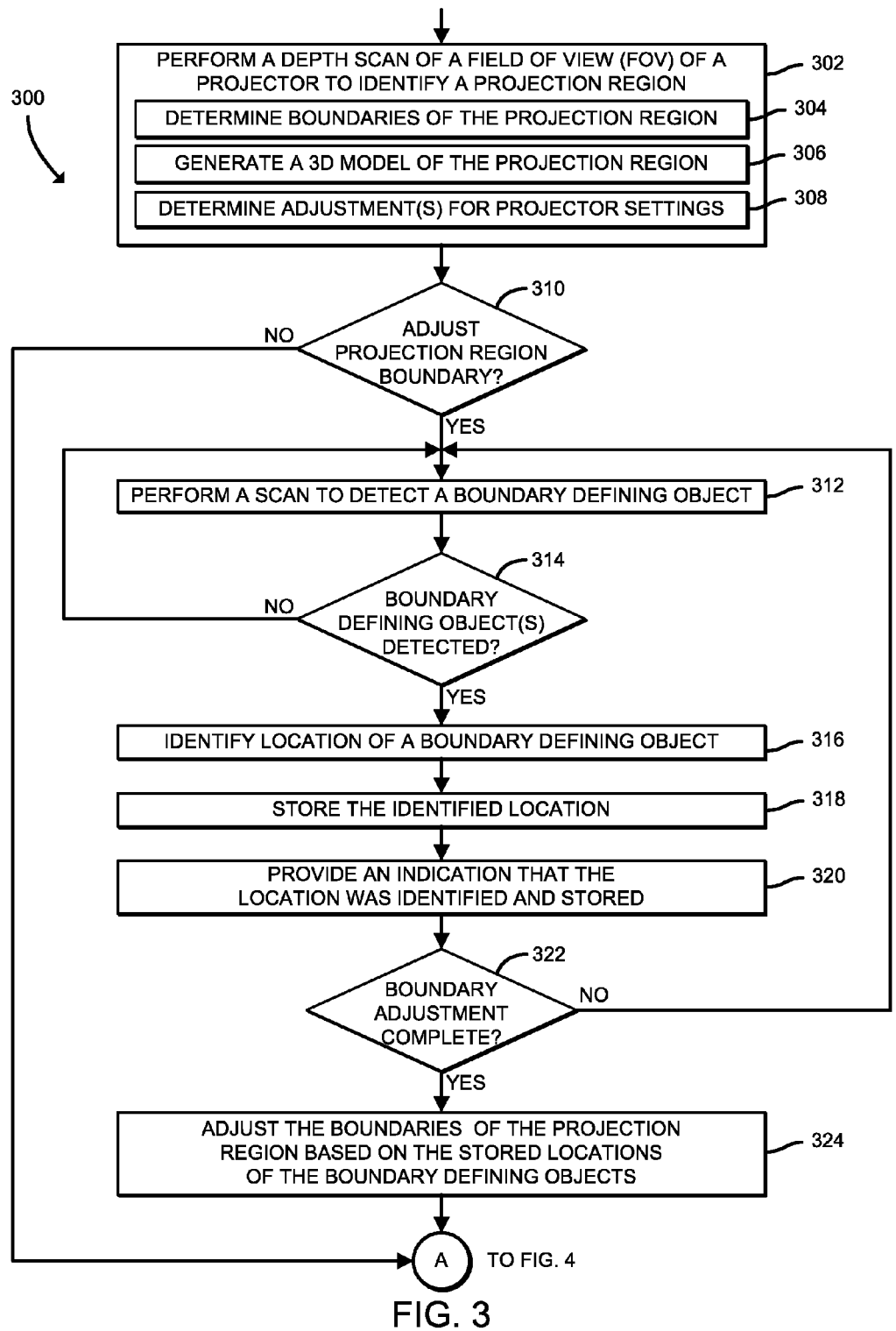
FIGS. 3-5 are a simplified flow diagram of at least one embodiment of a method for initializing a projection region on which to project an image that may be executed by the projection device of FIGS. 1 and 2.
Figure 8:
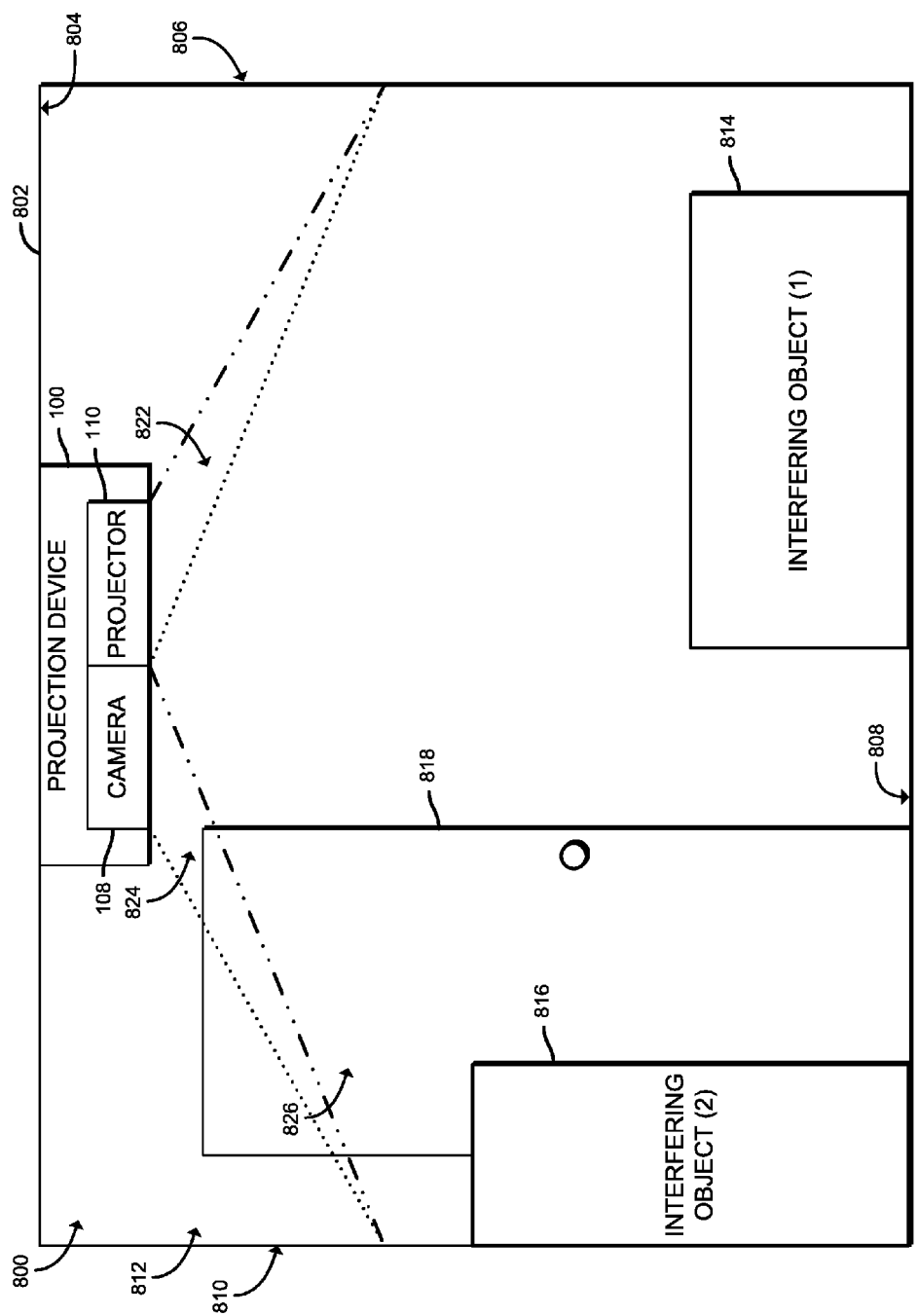
FIG. 8 is a simplified elevational view of at least one embodiment of the projection device of FIGS. 1 and 2 installed in a room and showing a field of view of a camera and a field of view of a projector of the projection device.

Referring now to FIG. 3, in use, the projection device 100 may execute a method 300 for initializing a projection region on which to project an image (i.e., illuminate). The method 300 begins with block 302, in which the projection device 100 performs a depth scan of a FOV of the projector 110 using the camera device 108 to identify an initial projection region (i.e., a surface on which to project an image). In block 304, the projection device 100 determines boundaries of the projection region. For example, as shown in FIG. 8, an elevational view 800 of a room 802 including the projection device 100 mounted to a ceiling 804 is shown. It should be appreciated, however, that the projection device 100 may be mounted on an alternative surface, such as a stand, a wall, etc., in other embodiments.

As also shown in FIG. 8, a projector FOV 822 of the projector 110 extends from one wall 810 to another wall 806, and across a floor 808 of the room 802. The projector FOV 822 of the projector 110 may provide the bounds for an initial, or default, boundary of the projection region 826. It should be appreciated that, as shown in overhead plan view 1100 of the room 802 in FIG. 11, the projection region 826 additionally extends to the other walls 812 and 1102 of the room 802. Similarly, a camera FOV 824 of the camera device 108 is shown having generally the same FOV as the projector FOV 822. It should be appreciated that, in some embodiments, the actual FOV of the camera device 108 (i.e., the camera FOV 824) may be larger than the projector FOV 822. However, in such embodiments, the camera device 108 may be calibrated to limit the camera FOV 824 to the projector FOV 822, such as when performing the depth scan within the projector FOV 822. In other words, in use, the camera FOV 824 of the camera device 108 may be generally the same as the projector FOV 822 of the projector 110.

Referring again to FIG. 3, in block 306, the projection device 100 generates a 3D model of the projection region. As described previously with regard to FIG. 8, the illustrative projection region 826 (i.e., the surface(s) of the room 802 that an image can be projected upon) extends from one wall 810 to another wall 806, and includes the floor 808 of the room 802; however, as shown in FIG. 8, portions of the illustrative floor 808 and walls 806, 810 are obstructed by two interfering objects. A first interfering object 814 (e.g., a bed), is designated as interfering object (1), and a second interfering object 816 (e.g., a dresser), is designated as interfering object (2). While the first and second interfering objects 814, 816 are shown in FIG. 8, it should be appreciated that, in some embodiments, none or one or more interfering objects may be present in the projection region 826. Accordingly, the 3D model of the projection region 826 for the illustrative room 802 can include the surfaces of the interfering objects 814, 816 exposed to the projector 110, the portions of the floor 808 not obstructed by the interfering objects 814, 816, and the portions of the walls 806, 810 within the FOV of the projector 110 that are not obstructed by the interfering objects 814, 816.

Referring again to FIG. 3, in block 308, the projection device 100 determines any adjustments to projection settings that may need to be made as a result of the determined boundaries and the 3D model of the projection region. For example, the projection settings may include a brightness setting, a contrast setting, a color setting, a tint setting, a sharpness setting, a zoom setting, a magnification setting, a lens shift setting, an aspect ratio, a resolution, and/or any other type of setting that can be adjusted to manipulate the projected image.

In block 310, the projection device 100 determines whether to adjust the default or initial boundary of the projection region (e.g., the projection region 826 of FIG. 8), resulting in an updated projection region. If not, the method 300 advances to block 326, which will be described below. To adjust the default boundary of the projection region, in some embodiments, the projection device 100 may provide a prompt to a user of the projection device 100 to determine whether the user desires to adjust the projection region. Additionally or alternatively, in some embodiments, the projection device 100 may check a mode setting of the projection device 100 corresponding to setting the boundary of the projection region, such as user versus automatic boundary setting, to determine whether the user is to adjust the projection region.

If the projection device 100 determines that the default boundary of the projection region is to be adjusted, the method 300 advances to block 312. In block 312, the projection device 100 performs a scan of the projection region to detect a boundary defining object (see the boundary defining objects 902 of FIGS. 9-13). The user may redefine the boundary of the projection region by moving or placing the boundary defining object(s) to boundary lines of the desired projection region. As described previously, the boundary defining object may provide a location to the projection device 100 or include a characteristic that is detectable by the projection device 100. For example, the boundary defining object may communicate over a particular radio frequency (e.g., Wi-Fi radio frequency identifier (RFID), Bluetooth, etc.) from which a location can be determined, emit a light or electronic field such that the projection device can detect the location, include a designated color that can be detected by the projection device and compared against the 3D model, and/or any other characteristic or technology that can be used for indoor location detection.

In block 314, the projection device 100 determines whether the boundary defining object was detected. It should be appreciated that, in some embodiments, more than one boundary defining object can be detected during a scan. In such embodiments, the projection region boundary may be adjusted in a single scan. If the projection device 100 does not detect the boundary defining object, the method returns to block 312 to perform another scan to detect the boundary defining object. Otherwise, if the projection device 100 does detect the boundary defining object, the method advances to block 316 to identify a location of the detected boundary defining object. In block 318, the projection device 100 stores the location of the boundary defining object identified in block 316. In some embodiments, the location of the boundary defining object identified in block 316 may be stored in the projection region data 202 of FIG. 2, for example.

In block 320, the projection device 100 provides an indication to the user that the location was identified and stored at the projection device 100. In block 322, the projection device 100 determines whether the boundary adjustment is complete. For example, to determine whether the boundary adjustment is complete, the projection device 100 may determine whether a boundary defining object has been located within a predefined proximity to the first location of the boundary defining object detected by the scan to adjust the projection region boundary. Additionally or alternatively, if a sufficient number of locations have been identified (i.e., more than 2 locations have been identified), the projection device 100 may prompt the user whether to automatically complete the boundary (i.e., close the region by creating another location automatically that corresponds to the first location of the boundary defining object detected by the scan to adjust the projection region boundary).

Figure 9:
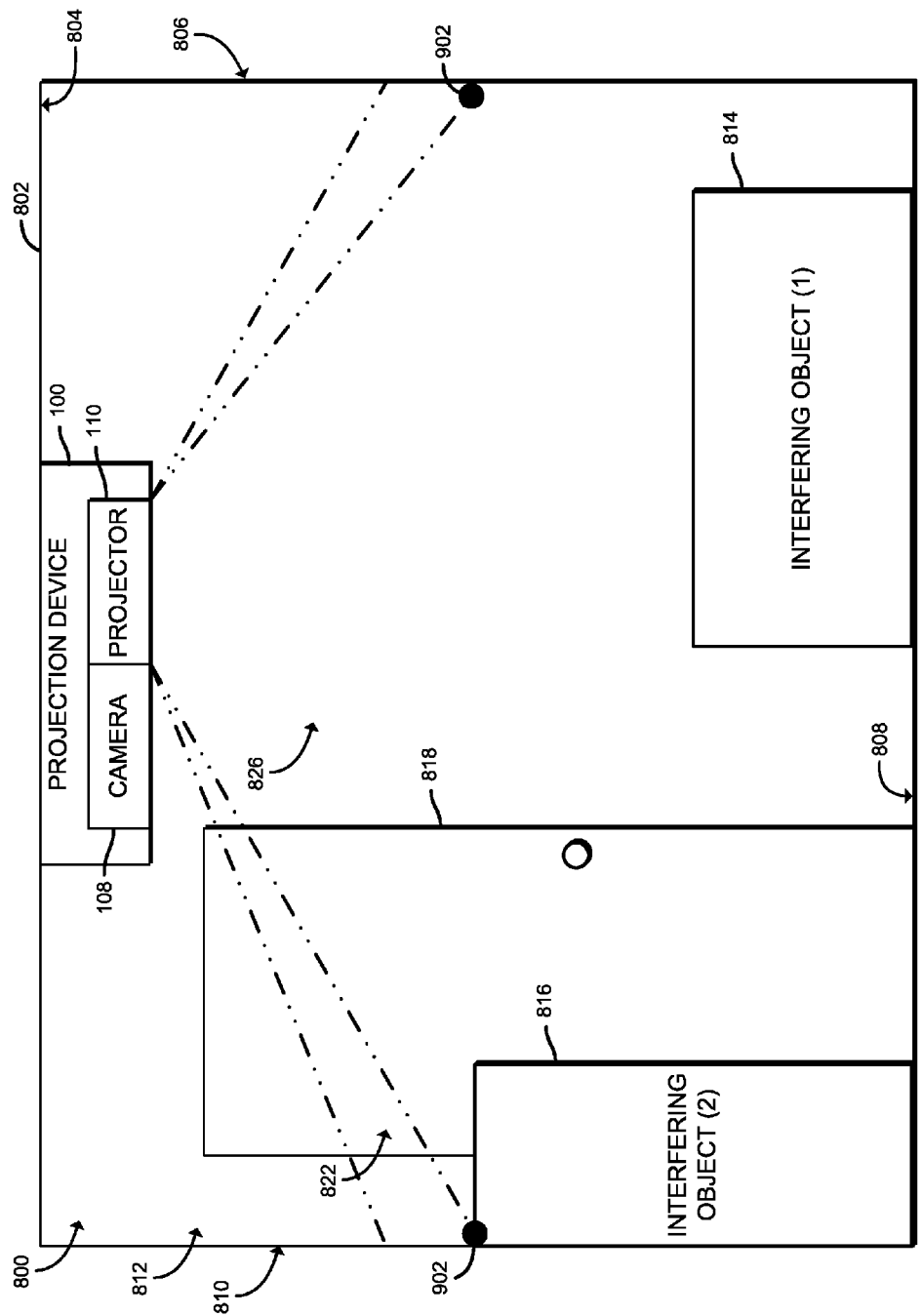
FIG. 9 is another simplified elevational view of the projection device of FIG. 8 showing an updated projection region of the projector of the projection device.

If the projection device 100 determines that the cut-out area is not complete, the method 300 returns to block 312 to perform another scan to detect the boundary defining object again. Otherwise, the method 300 advances to block 324, wherein the projection device 100 adjusts the projection region boundaries based on the stored locations of the identified boundary defining objects. For example, as shown in FIG. 9, the illustrative boundary defining objects 902 are positioned along the walls 806 and 810 to effectively reduce a size of the projection region 826 from the projector FOV 822 that initially defined the projection region 826.

Figure 4:
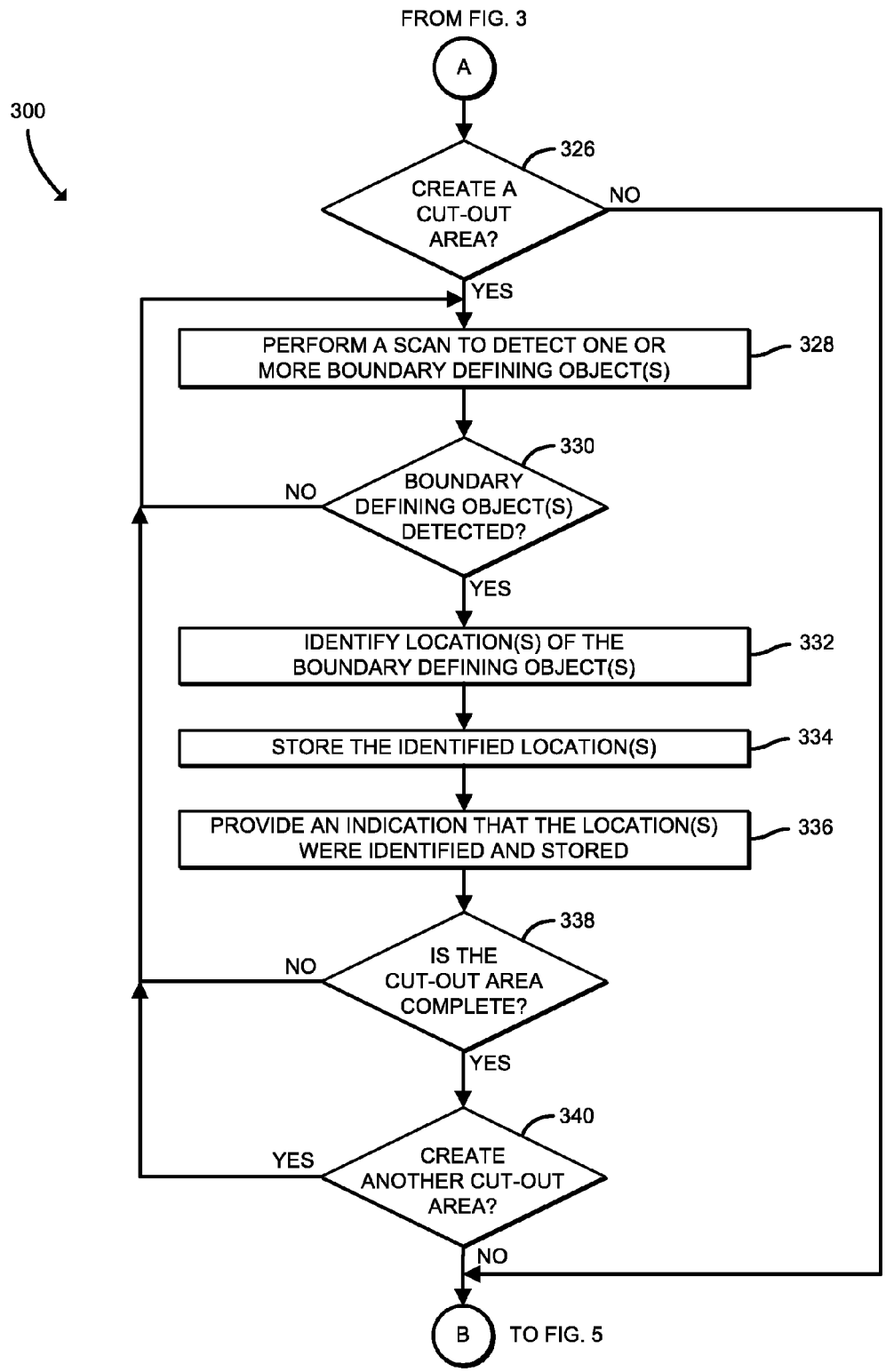

From block 324, the method 300 advances to block 326, shown in FIG. 4. In block 326, the projection device 100 determines whether to create a cut-out area from the projection region. If not, the method advances to block 342, which will be described below. As described previously, a cut-out area defines an area of the projection region in which any portion of the mage is not to be projected within (i.e., light is not to be emitted from the projector 110 to the cut-out area of the projection region). If the projection device 100 determines to create the cut-out area, the method 300 advances to block 328.

Similar to the projection region boundary adjustment described in FIG. 3, the creation of the cut-out area is performed using one or more boundary defining objects (see the boundary defining objects 902 of FIG. 10). Accordingly, in block 328, the projection device 100 performs a scan of the projection region to detect one or more boundary defining objects. As described previously, each of the boundary defining objects may provide a location to the projection device 100 or include a characteristic that is detectable by the projection device 100.

In block 330, the projection device 100 determines whether the boundary defining objects were detected. If the projection device 100 does not detect the boundary defining object, the method returns to block 328 to perform another scan to detect the boundary defining object. Otherwise, if the projection device 100 does detect the boundary defining object, the method 300 advances to block 332 to identify a location of the detected boundary defining object. In block 334, the projection device 100 stores the location of the boundary defining object identified in block 332. In some embodiments, the location of the boundary defining object identified in block 332 may be stored in the projection region data 202 of FIG. 2, for example.

In block 336, the projection device 100 provides an indication to the user that the location was identified and stored at the projection device 100. In block 338, the projection device 100 determines whether the cut-out area is complete. In other words, the projection device 100 determines whether a boundary of the cut-out area is complete, or defined. Similar to the projection region boundary adjustment of blocks 316-322 of FIG. 3, the projection device 100 may determine whether the boundary is complete based on whether a boundary defining object has been located within a predefined proximity to the first location of the boundary defining object detected by the scan to create the cut-out area. Additionally or alternatively, if a sufficient number of locations have been identified (i.e., more than 2 locations have been identified), the projection device 100 may prompt the user whether to automatically complete the boundary (i.e., create another location automatically that corresponds to the first location of the boundary defining object detected by the scan to adjust the projection region boundary).

Figure 11:
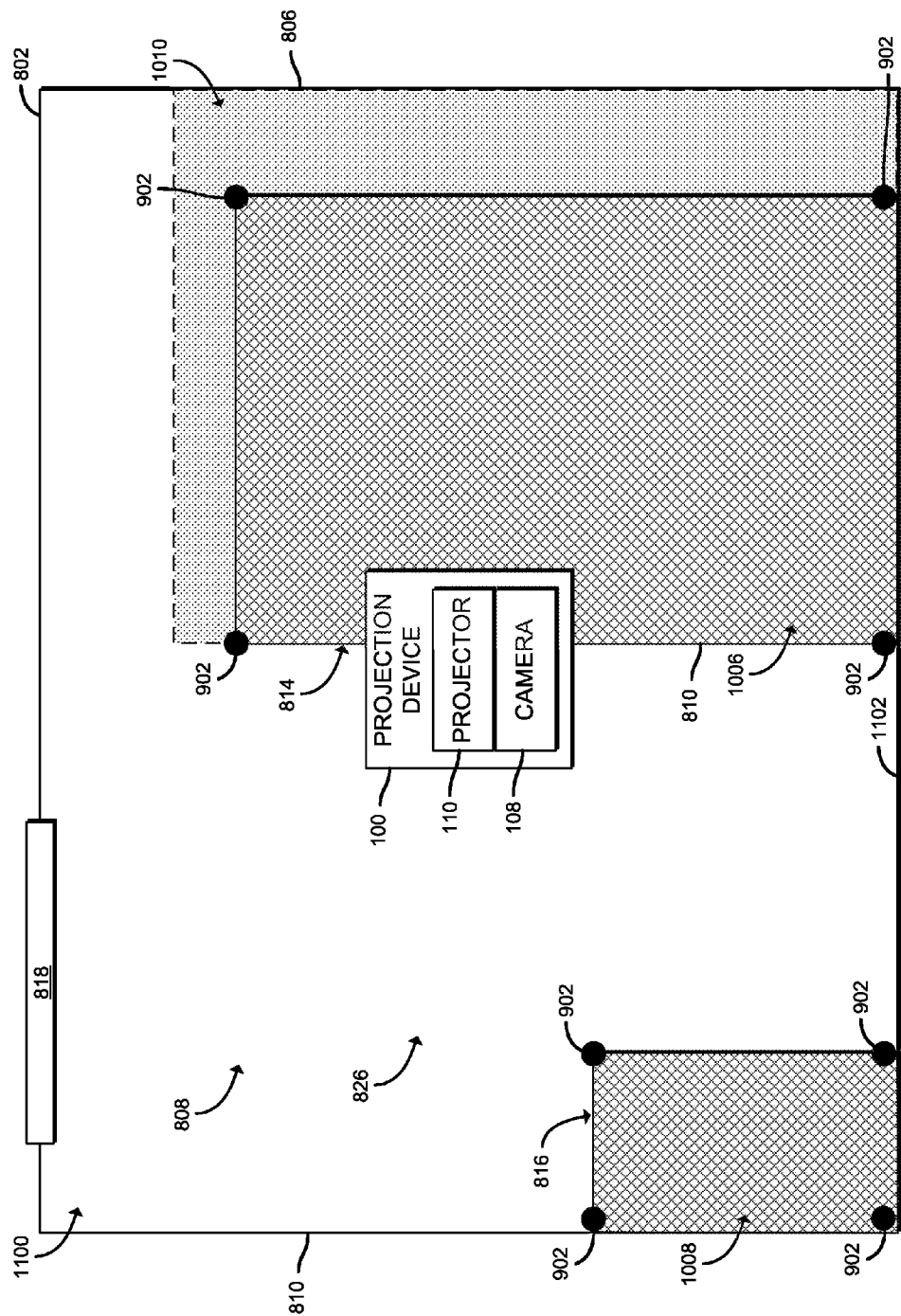
FIG. 11 is a simplified plan view of the projection device of FIG. 8 showing the updated projection region illustrated in FIG. 10.

For example, as shown in FIG. 10, the boundary defining objects 902 define a cut-out area on a top surface 1002 of the first interfering object 814, and another cut-out area on a top surface 1004 of the second interfering object 816. It should be appreciated that to cut-out the top surfaces 1002, 1004, additional boundary defining objects 902 may need to be detected at each corner of the boundary defining the top surfaces 1002, 1004, as shown in the overhead plan view 1100 of the room 802 of FIG. 11. It should be appreciated that cut-out areas are not restricted to being defined on a top surface of an interfering object, as shown in FIGS. 10 and 11. For example, in some embodiments, the boundary defining objects 902 may define cut-out areas that include the entire interfering object (e.g., a front surface 1012 of the second interfering object 1012).

The overhead view 1100 additionally includes another wall 1102 that encloses the room 802, along with the other walls 806, 810, 812, to form an outer surface boundary of the projection region 826. Referring back to FIG. 10, a cut-out area 1006 is shown as a result of the boundary defining object locations that were identified at each corner of the top surface 1002 of the first interfering object 814. Similarly, another cut-out area 1008 is shown as a result of the boundary defining object locations that were identified at each corner of the top surface 1004 of the second interfering object 816. Further, as shown in FIGS. 10 and 11, depending on the height of the projection device, the angle of projection of the image, and the height of the interfering object(s) within the projection region 826, a non-projectable area 1010 may result. In other words, due to the angle of projection and the obstruction by the interfering object(s), there may be portions of the projection region that cannot be projected upon (i.e., the non-projectable area 1010).

Figure 5:
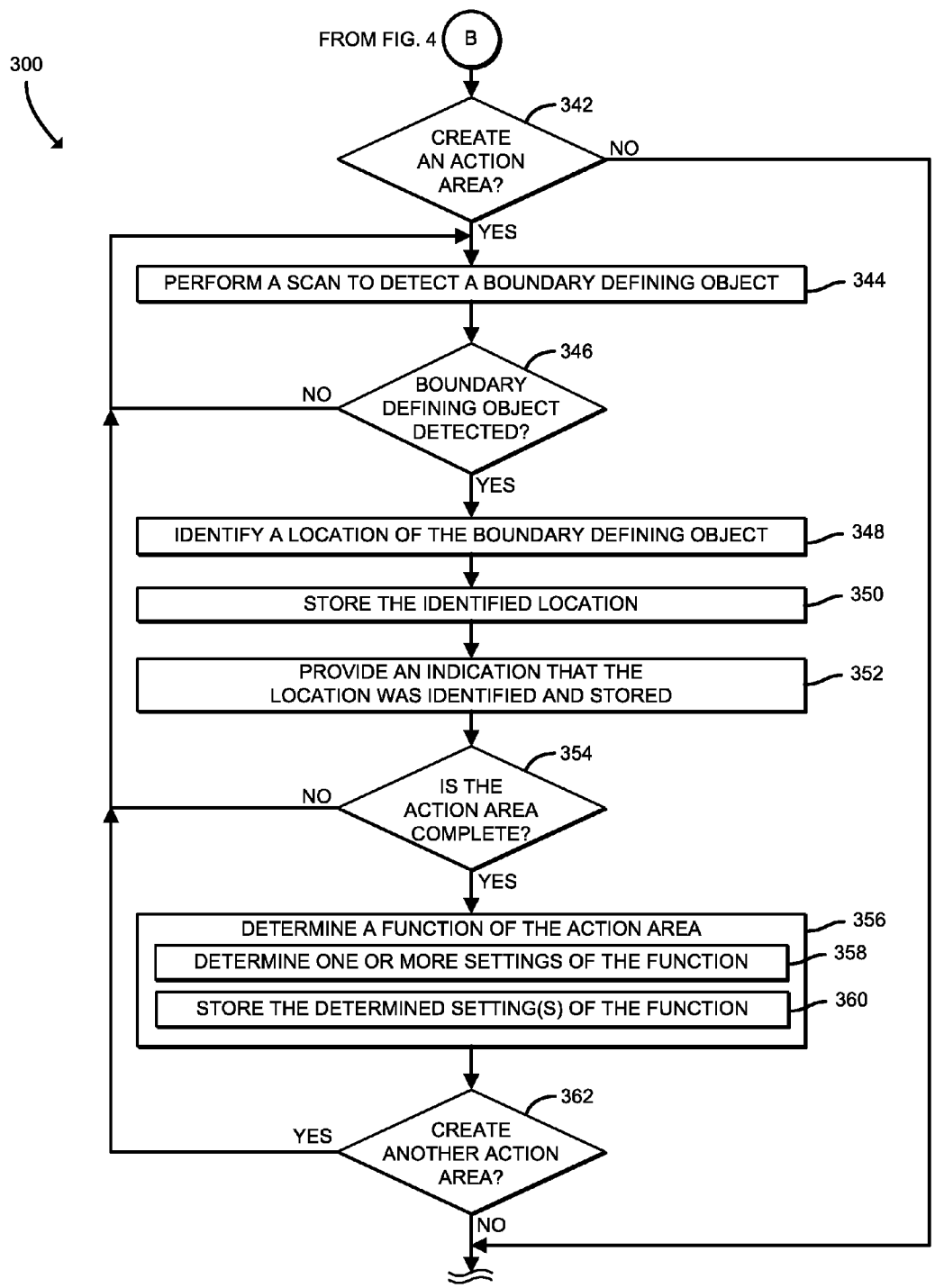

Referring again to FIG. 4, if the projection device 100 determines that the boundary adjustment is not complete, the method 300 returns to block 328 to perform another scan to detect the boundary defining object again. Otherwise, the method 300 advances to block 340, wherein the projection device 100 determines whether to create another cut-out area. To do so, in some embodiments, the projection device may prompt the user to determine whether the user wants to create another cut-out area. If another cut-out area is to be created, the method 300 returns to block 328 to perform another scan to detect the boundary defining object; otherwise, the method advances to block 342, shown in FIG. 5.

In block 342, the projection device determines whether to create an action area. If not, the method 300 terminates and initialization is complete. As described previously, the action area defines an area of the projection region capable of displaying an image as a result of a function associated with the action area being triggered. Similar to the projection region boundary adjustment described in FIG. 3 and the cut-out area creation described in FIG. 4, the creation of the action area is performed using one or more boundary defining objects (see the boundary defining objects 902 of FIG. 12). Accordingly, in block 344, the projection device 100 performs a scan of the projection region to detect one or more boundary defining objects. As described previously, each of the boundary defining objects may provide a location to the projection device 100 or include a characteristic that is detectable by the projection device 100.

In block 346, the projection device 100 determines whether the boundary defining objects were detected. If the projection device 100 does not detect the boundary defining object, the method returns to block 344 to perform another scan to detect the boundary defining object. Otherwise, if the projection device 100 does detect the boundary defining object, the method advances to block 348 to identify a location of the detected boundary defining object. In block 350, the projection device 100 stores the location of the boundary defining object identified in block 348. In some embodiments, the location of the boundary defining object identified in block 348 may be stored in the projection region data 202 of FIG. 2, for example.

In block 352, the projection device 100 provides an indication to the user that the location was identified and stored at the projection device 100. In block 354, the projection device 100 determines whether the action area is complete. In other words, the projection device 100 determines whether a boundary of the action area is complete, or defined. Similar to the projection region boundary adjustment of FIG. 3 and the cut-out area creation of FIG. 4, the projection device 100 may determine whether the boundary is complete based on whether a boundary defining object has been located within a predefined proximity to the first location of the boundary defining object detected by the scan to create the cut-out area. Additionally or alternatively, if a sufficient number of locations have been identified (i.e., more than 2 locations have been identified), the projection device 100 may prompt the user whether to automatically complete the boundary (i.e., create another location automatically that corresponds to the first location of the boundary defining object detected by the scan to adjust the projection region boundary).

Figure 12:
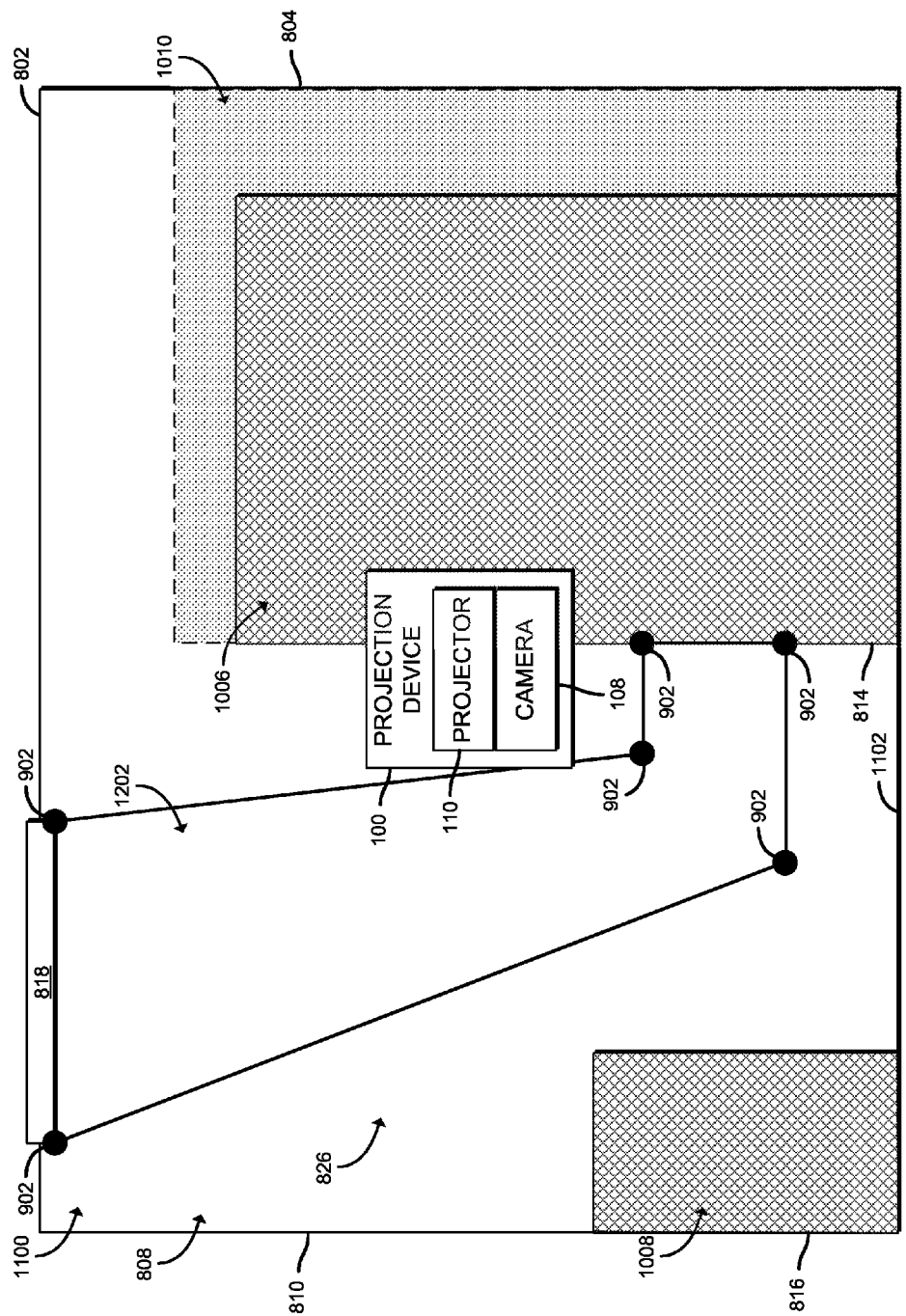
FIG. 12 is a simplified plan view of the projection device of FIG. 8 showing the updated projection region illustrated in FIG. 11 including at least one embodiment of a defined action area.

For example, as shown in FIG. 12, the boundary defining objects 902 define an action area 1202 that extends along the floor 808 from the door 818 to the first interfering object 814. It should be appreciated that action areas are not restricted to being defined on a surface generally perpendicular to the projection device 100, such as the floor 808 in FIG. 12. In some embodiments, the boundary defining objects 902 may define an action area that extends across a portion of one of the walls of the room 802. For example, in such an embodiment, an action area may be created on a portion of the wall 806 adjacent to the first interfering object 814, such that an image can be displayed within the action area on the designated portion of the wall 806.

Referring again to FIG. 5, if the projection device 100 determined the action area is not complete, the method 300 returns to block 344 to perform another scan to detect the boundary defining object. Otherwise, if the projection device 100 determined the action area is complete, the method advances to block 356, in which the projection device 100 determines a function of the action area. To do so, in some embodiments, the projection device 100 may provide an instruction to the user of the projection device 100 that indicates the user can select a function to associate with the action area. In such embodiments, the user may select the function from a predefined set of functions. For example, in FIG. 13, a function 1302 is shown that corresponds to a set of footprints which may be displayed along the action area 1202 defined in FIG. 12. Additionally or alternatively, in some embodiments, the projection device 100 may be configured to receive a user-defined function, which may be selected by the user to be associated with the action area.

The functions, as described previously, may be triggered by one or more environment conditions based on one or more settings associated with the functions. Accordingly, in block 358, the projection device 100 determines one or more settings of the function. For example, the settings may include an environment condition that may be detected via one or more sensors 112 of the projection device 100, such as a time of day, a motion detected by the motion sensor 114, an amount of light detected by the light sensor 116, and/or any other type of environment condition that may be detected within the environment of the projection device 100. Additionally and/or alternatively, the settings may include which actions to be performed by the projection device 100 when the functions are triggered, such as which images to display, whether to play audio during the action, etc. In block 360, the projection device 100 stores the function settings in, for example, the projection action data 204 of FIG. 2.

Figure 13:
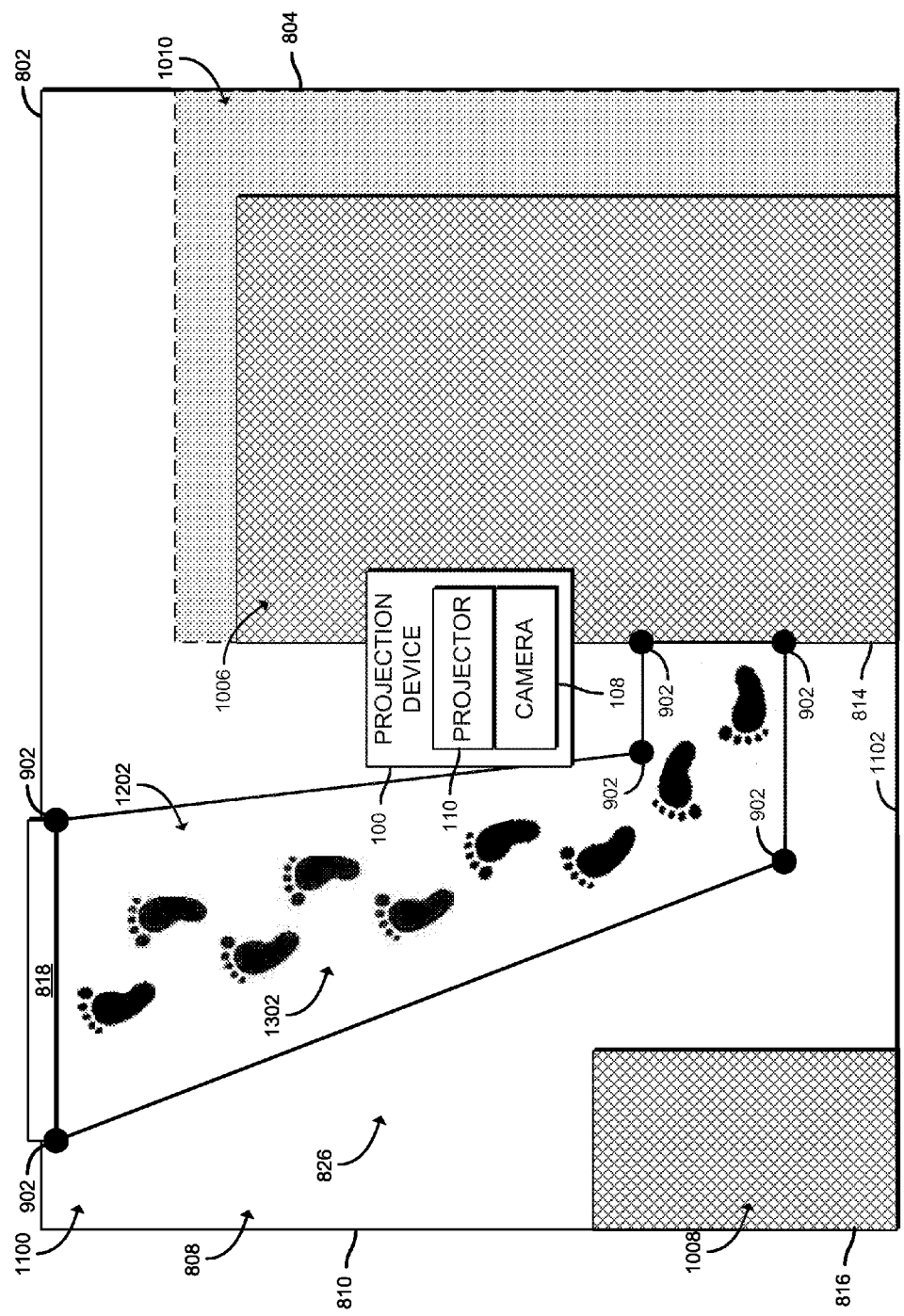
FIG. 13 is a simplified plan view of the projection device of FIG. 8 showing the updated projection region illustrated in FIG. 12 including an executed function of the action area illustrated in FIG. 12.

As previously described, in the illustrative function 1302 of FIG. 13, the set of footprints are displayed within the action area 1202 of FIG. 12. In such embodiments, the function 1302 may be triggered by various settings associated with the function 1302 (e.g., the function settings determined by the projection device 100 in block 358 of FIG. 3). It should be appreciated that, in some embodiments, action area functions may be manually enabled (i.e., turned on), such as on setup of the action area, or automatically enabled when certain environment conditions have been met. For example, the action area 1202 may be enabled (i.e., the function 1302 of the action area 1202 may be enabled) based on a time of day that corresponds to a child's bedtime and a detected illuminance level that corresponds to a level of darkness typically associated with the room 802 at night. Accordingly, the settings may include environment conditions for which an action area function is to be enabled and/or triggered. Additionally, in furtherance of the example, the function 1302 may be triggered by one or more environment conditions after the function 1302 has been enabled, such as by a motion detected by the motion sensor 114 or a voice command gesture detected by a microphone (e.g., a peripheral device 120 of FIG. 1) of the projection device 100.

It should be appreciated that, in some embodiments, the boundary defining objects 902 may be used to determine a point of interest, such as a door 818 of the room 802 of FIG. 8 or an interfering object, from which the projection device 100 may detect, based on the 3D model and an indication by the user, a cut-out area or an action area. For example, a user may identify the first interfering object 814 as one point of interest and the door 818 as another point of interest, such as by using one of the boundary defining objects, and provide an indication to the projection device 100 that the points of interest are a starting point and ending point, respectively, for a particular function (e.g., projecting a path between the points of interest). Accordingly, the projection device 100 may use the 3D model to automatically determine where to project a path (i.e., around any obstructions in the room 802) similar to the action area 1202 of FIG. 12 between the two points of interest (i.e., the first interfering object 814 and the door 818).

In another example, a user may identify a surface (e.g., the top surface 1004) of the second interfering object 816 as a point of interest, such as by using one of the boundary defining objects, and provide an indication to the projection device 100 that the point of interest is to be a cut-out area. Accordingly, the projection device 100 may use the 3D model to automatically detect the surface of the second interfering object 814 and set it as a cut-out area. In still another example, a user may identify an area of interest, such as a top of the bed (e.g., the top surface 1002 of the first interfering object 814 as shown in FIG. 11) on which to detect an environment condition, such as movement. As described previously, in an illustrative embodiment, the function 1302 may be triggered by one or more environment conditions, such as by a motion detected by the motion sensor 114. Accordingly, in such embodiments, the function 1302 may be triggered by a motion detected within the area of interest.

Referring again to FIG. 5, if the projection device 100 determines another action area is to be created, the method 300 returns to block 344, in which another scan is performed to detect the boundary defining object for defining a boundary of the next action area. Otherwise, if the projection device 100 determines not to create another action area, the method 300 terminates.

Figure 6:
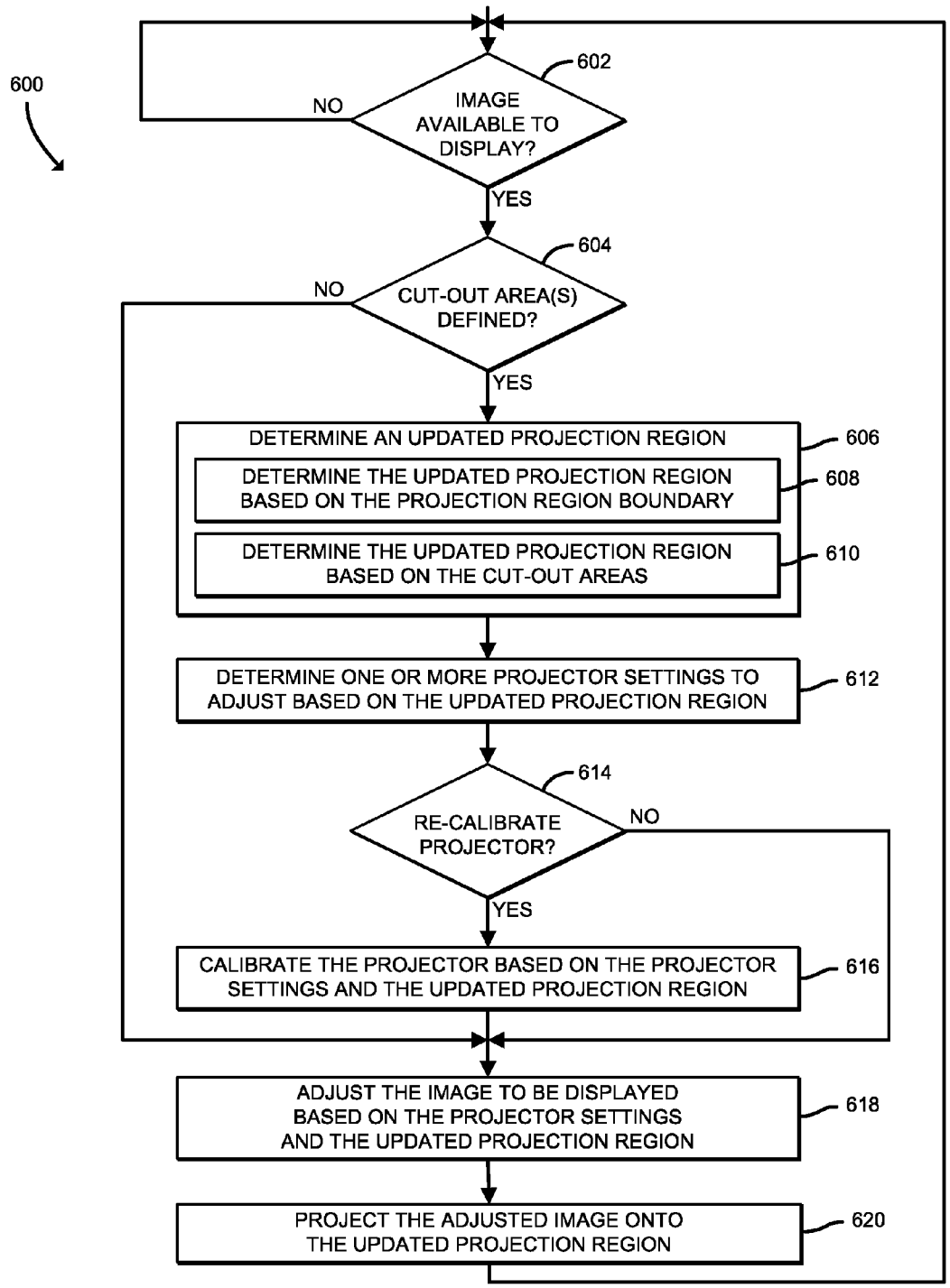
FIG. 6 is a simplified flow diagram of at least one embodiment of a method for projecting an image onto a projection region that may be executed by the projection device of FIGS. 1 and 2.

Referring now to FIG. 6, in use, the projection device 100 may execute a method 600 for projecting an image onto a projection region (e.g., the projection region 826). The method 600 begins with block 602, in which the projection device 100 determines whether an image is available to display. It should be appreciated that the projection device 100 may remain on while not projecting an image, such as when an action area is enabled and the projection device 100 is monitoring for environment conditions in which to trigger the action area. Accordingly, if an image is not available to display, the method 600 loops back to block 602 to determine whether an image is available to display. Otherwise, if an image is available to display, the method advances to block 604, wherein the projection device 100 determines whether any cut-out areas have been defined within the projection region. If not, the method 600 advances to block 618, which will be described below. If one or more cut-out areas are defined, the method 600 advances to block 606, wherein the projection device 100 determines an updated projection region. To do so, in block 608, the projection device 100 determines the updated projection region based on the projection region boundary. Further, in block 610, the projection device 100 determines the updated projection region based on the cut-out areas. Additionally, in block 612, the projection device 100 determines one or more projector settings to adjust based on the updated projection region. As described previously, the projector settings may include brightness, contrast, color, tint, sharpness, zoom, magnification, hue, saturation, lens shift, aspect ratio, resolution, and the like.

In block 614, the projection device 100 determines whether the projector 110 of the projection device 100 needs re-calibrated based on the updated projection region. If the projector 110 needs re-calibrated, the method 600 advances to block 616, wherein the projection device 100 calibrates the projector 110 based on the projector settings determined at block 612. If, in block 614, the projection device determines the projector does not need re-calibrated, the method 600 advances to block 618, wherein the projection device adjusts the image to be displayed based on the projector settings determined at block 612 and the updated projection region. Similarly, from block 616, the method 600 advances to block 618 to adjust the image as previously described, before advancing to block 620, wherein the projection device 100 projects the adjusted image onto the updated projection region.

Figure 7:
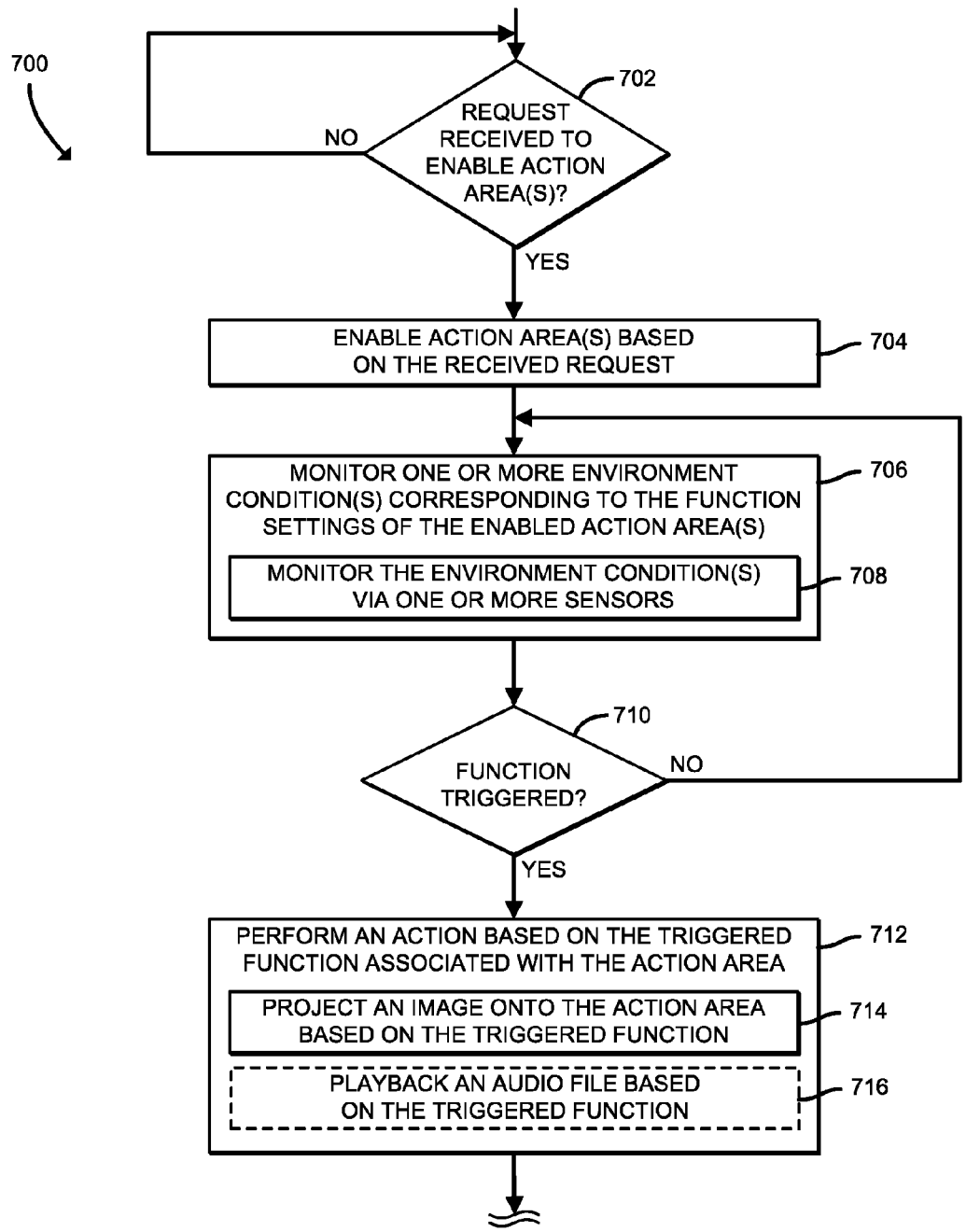
FIG. 7 is a simplified flow diagram of at least one embodiment of a method for projecting an image onto an action area that may be executed by the projection device of FIGS. 1 and 2.

Referring now to FIG. 7, in use, the projection device 100 may execute a method 700 for projecting an image onto an action area (e.g., the action area 1202 of FIG. 12). The method 700 begins with block 702, in which the projection device 100 determines whether a request to enable one or more action areas was received. As described previously, an action area may be enabled manually, such as by a user during creation of the action area, or automatically enabled upon detection by the projection device 100 of one or more environment conditions associated with a function of the action area. If the projection device 100 determines that the request to enable an action area was received, the method 700 advances to block 704, wherein the projection device 100 enables the action area(s) based on the received enable request. Otherwise, if the projection device 100 determines that the request to enable an action area was not received, the method 700 loops back to block 702 to continue to determine whether the request was received to enable the action area.

In block 706, the projection device 100 monitors one or more environment conditions corresponding to the function settings of the enabled action areas. To do so, at block 708, the projection device 100 monitors one or more sensors of the projection device 100 (e.g., the sensors 112) to determine whether one or more environment conditions are met, triggering a function of one or more of the enabled action areas. Accordingly, at block 710, the projection device 100 determines whether a function of one of the enabled action areas is triggered. If not, the method 700 returns back to block 706 to continue monitoring the one or more environment conditions.

If the projection device 100 determined one of the enabled action area functions was triggered, the method advances from block 710 to block 712. In block 712, the projection device performs an action based on the triggered function associated with the action area. To do so, the projection device 100 projects an image onto the at least a portion of the action area, based on the triggered function. Additionally or alternatively, in some embodiments, the projection device 100 may play back an audio file based on the triggered function. In such embodiments, playback of the audio file may be synchronized with the series of images to be projected based on the triggered function. It should be appreciated that additional or alternative actions, including visual, audio, and/or tactile actions, based on the triggered function may be performed by the projection device, depending on the capability of the components contained therein.

EXAMPLES

Illustrative examples of the technologies disclosed herein are provided below. An embodiment of the technologies may include any one or more, and any combination of, the examples described below.

Example 1 includes a projection device to project a noncontinuous image, the projection device comprising a projector to project an image onto a projection region, wherein the projection region defines a region on which the image is to be projected by the projector; a projection initialization module to (i) determine a boundary of the projection region, (ii) determine at least one cut-out area of the projection region, wherein the at least one cut-out area defines an area within the projection region on which a corresponding portion of the image is not to be projected by the projector of the projection device, and (iii) generate an updated projection region based on the determined boundary of the projection region and the determined at least one cut-out area; and a projection management module to project the image onto the updated projection region via the projector, wherein no portion of the image is projected on the at least one cut-out area.

Example 2 includes the subject matter of Example 1, and wherein to determine the boundary of the projection region comprises to perform, using a camera of the projection device, a depth scan to identify the projection region in a field of view of the projector of the projection device.

Example 3 includes the subject matter of any of Examples 1 and 2, and further including to adjust the boundary of the projection region, wherein adjusting the boundary of the projection region comprises to (i) perform a scan to detect one or more boundary defining objects, (ii) identify a location of each of the one or more boundary defining objects, wherein each location identifies a point along a new boundary of the projection region, and (iii) adjust the boundary of the projection region based on each of the identified locations.

Example 4 includes the subject matter of any of Examples 1-3, and wherein to determine the at least one cut-out area of the projection region comprises to (i) perform a scan to detect one or more boundary defining objects, (ii) identify a location of each of the one or more boundary defining objects, wherein each location identifies a point along the cut-out area, and (iii) generate the cut-out area based on each of the identified locations.

Example 5 includes the subject matter of any of Examples 1-4, and wherein to not project the portion of the projection region that corresponds to the cut-out area comprises to emit substantially no light from the projector onto the cut-out area of the projection region.

Example 6 includes the subject matter of any of Examples 1-5, and further including an action area determination module to (i) determine an action area of the projection region, wherein the action area defines an area within the projection region on which the image is to be projected by the projector of the projection device in response to a determination that a function associated with the action area is triggered, (ii) perform a scan to determine an action area boundary of the action area, wherein the action area boundary of the action area defines at least one of the size and shape of the action area, (iii) determine the action area boundary of the action area based on the scan, (iv) create an action area based on the determined action area boundary of the action area, and (v) store data identifying the action area.

Example 7 includes the subject matter of any of Examples 1-6, and wherein the action area determination module is further to (i) determine the function to associate with the action area, (ii) determine one or more settings of the function, wherein the one or more settings include one or more environment conditions of an environment of the projection region, and wherein the environment conditions define a trigger that, when satisfied, cause the projection device to perform the function, and (iii) store the function of the action area and the one or more settings of the function.

Example 8 includes the subject matter of any of Examples 1-7, and wherein to determine the one or more environment conditions comprises to monitor one or more sensors of the projection device to detect the environment conditions.

Example 9 includes the subject matter of any of Examples 1-8, and further including an action area function performance module to perform an action based on a determination that the function associated with the action area is triggered, wherein the action comprises at least one of projecting the image onto the action area and playing back an audio file during at least a portion of the image projection.

Example 10 includes the subject matter of any of Examples 1-9, and wherein the projection management module is further to (i) determine one or more settings of the projector based on the updated projection region and (ii) calibrate the projector based on the one or more projector settings.

Example 11 includes the subject matter of any of Examples 1-10, and, wherein the projection management module is further to (i) adjust the image to be projected based on the updated projection region and (ii) project the adjusted image onto the updated projection region.

Example 12 includes a method for projecting a noncontinuous image, the method comprising determining, by a projection device, a boundary of a projection region, wherein the projection region defines a region on which an image is to be projected by a projector of the projection device; determining, by the projection device, at least one cut-out area of the projection region, wherein the at least one cut-out area defines an area within the projection region on which a corresponding portion of the image is not to be projected by the projector of the projection device; generating, by the projection device, an updated projection region based on the determined boundary of the projection region and the determined at least one cut-out area; and projecting, by the projector of the projection device, the image onto the updated projection region, wherein no portion of the image is projected on the at least one cut-out area.

Example 13 includes the subject matter of Example 12, and wherein determining the boundary of the projection region comprises performing, using a camera of the projection device, a depth scan to identify the projection region in a field of view of the projector of the projection device.

Example 14 includes the subject matter of any of Examples 12 and 13, and further including adjusting the boundary of the projection region, wherein adjusting the boundary of the projection region comprises (i) performing a scan to detect one or more boundary defining objects, (ii) identifying a location of each of the one or more boundary defining objects, wherein each location identifies a point along a new boundary of the projection region, and (iii) adjusting the boundary of the projection region based on each of the identified locations.

Example 15 includes the subject matter of any of Examples 12-14, and wherein determining the at least one cut-out area of the projection region comprises (i) performing a scan to detect one or more boundary defining objects, (ii) identifying a location of each of the one or more boundary defining objects, wherein each location identifies a point along a cut-out area, and (iii) generating the cut-out area based on each of the identified locations.

Example 16 includes the subject matter of any of Examples 12-15, and wherein not projecting the portion of the projection region that corresponds to the cut-out area comprises emitting substantially no light from the projector onto the cut-out area of the projection region.

Example 17 includes the subject matter of any of Examples 12-16, and further including determining, by the projection device, an action area of the projection region, wherein the action area defines an area within the projection region on which the image is to be projected by the projector of the projection device in response to a determination that a function associated with the action area is triggered; performing, by the projection device, a scan to determine an action area boundary of the action area, wherein the action area boundary of the action area defines at least one of the size and shape of the action area; determining, by the projection device, the action area boundary of the action area based on the scan; creating, by the projection device, an action area based on the determined action area boundary of the action area; and storing, by the projection device, data identifying the action area.

Example 18 includes the subject matter of any of Examples 12-17, and further including determining, by the projection device, the function to associate with the action area; determining, by the projection device, one or more settings of the function, wherein the one or more settings include one or more environment conditions of an environment of the projection region, and wherein the environment conditions define a trigger that, when satisfied, cause the projection device to perform the function; and storing, by the projection device, the function of the action area and the one or more settings of the function.

Example 19 includes the subject matter of any of Examples 12-18, and wherein determining the one or more environment conditions comprises monitoring one or more sensors of the projection device to detect the environment conditions.

Example 20 includes the subject matter of any of Examples 12-19, and further including performing an action based on a determination that the function associated with the action area is triggered, wherein the action comprises at least one of projecting the image onto the action area and playing back an audio file during at least a portion of the image projection.

Example 21 includes the subject matter of any of Examples 12-20, and further including determining one or more settings of the projector based on the updated projection region; and calibrating the projector based on the one or more projector settings.

Example 22 includes the subject matter of any of Examples 12-21, and further including adjusting the image to be projected based on the updated projection region; and projecting the adjusted image onto the updated projection region.

Example 23 includes a computing device comprising a processor; and a memory having stored therein a plurality of instructions that when executed by the processor cause the computing device to perform the method of any of Examples 12-22.

Example 24 includes one or more machine readable storage media comprising a plurality of instructions stored thereon that in response to being executed result in a computing device performing the method of any of Examples 12-22.

Example 25 includes a projection device for projecting a noncontinuous image, the projection device comprising means for determining a boundary of a projection region, wherein the projection region defines a region on which an image is to be projected by a projector of the projection device; means for determining at least one cut-out area of the projection region, wherein the at least one cut-out area defines an area within the projection region on which a corresponding portion of the image is not to be projected by the projector of the projection device; means for generating an updated projection region based on the determined boundary of the projection region and the determined at least one cut-out area; and means for projecting, by a projector of the projection device, the image onto the updated projection region, wherein no portion of the image is projected on the at least one cut-out area.

Example 26 includes the subject matter of Example 25, and wherein the means for determining the boundary of the projection region comprises means for performing, using a camera of the projection device, a depth scan to identify the projection region in a field of view of the projector of the projection device.

Example 27 includes the subject matter of any of Examples 25 and 26, and further including means for adjusting the boundary of the projection region, wherein adjusting the boundary of the projection region comprises means for (i) performing a scan to detect one or more boundary defining objects, (ii) identifying a location of each of the one or more boundary defining objects, wherein each location identifies a point along a new boundary of the projection region, and (iii) adjusting the boundary of the projection region based on each of the identified locations.

Example 28 includes the subject matter of any of Examples 25-27, and wherein the means for determining the at least one cut-out area of the projection region comprises means for (i) performing a scan to detect one or more boundary defining objects, (ii) identifying a location of each of the one or more boundary defining objects, wherein each location identifies a point along a cut-out area, and (iii) generating the cut-out area based on each of the identified locations.

Example 29 includes the subject matter of any of Examples 25-28, and wherein not projecting the portion of the projection region that corresponds to the cut-out area comprises emitting substantially no light from the projector onto the cut-out area of the projection region.

Example 30 includes the subject matter of any of Examples 25-29, and further including means for determining an action area of the projection region, wherein the action area defines an area within the projection region on which the image is to be projected by the projector of the projection device in response to a determination that a function associated with the action area is triggered; means for performing a scan to determine an action area boundary of the action area, wherein the action area boundary of the action area defines at least one of the size and shape of the action area; means for determining the action area boundary of the action area based on the scan; means for creating an action area based on the determined action area boundary of the action area; and means for storing data identifying the action area.

Example 31 includes the subject matter of any of Examples 25-30, and further including means for determining the function to associate with the action area; means for determining one or more settings of the function, wherein the one or more settings include one or more environment conditions of an environment of the projection region, and wherein the environment conditions define a trigger that, when satisfied, cause the projection device to perform the function; and means for storing the function of the action area and the one or more settings of the function.

Example 32 includes the subject matter of any of Examples 25-31, and, wherein the means for determining the one or more environment conditions comprises means for monitoring one or more sensors of the projection device to detect the environment conditions.

Example 33 includes the subject matter of any of Examples 25-32, and further including means for performing an action based on a determination that the function associated with the action area is triggered, wherein the means for performing the action comprises means for at least one of projecting the image onto the action area and playing back an audio file during at least a portion of the image projection.

Example 34 includes the subject matter of any of Examples 25-33, and further including means for determining one or more settings of the projector based on the updated projection region; and means for calibrating the projector based on the one or more projector settings.

The invention claimed is:
1. A projection device to project a noncontinuous image, the projection device comprising:

a projector to project an image onto a projection region, wherein the projection region defines a region on which the image is to be projected by the projector;

a projection initialization module to (i) determine a boundary of the projection region, (ii) determine at least one cut-out area of the projection region, wherein the at least one cut-out area defines an area within the projection region on which a corresponding portion of the image is not to be projected by the projector of the projection device, and (iii) generate an updated projection region based on the determined boundary of the projection region and the determined at least one cut-out area; and a projection management module to project the image onto the updated projection region via the projector, wherein no portion of the image is projected on the at least one cut-out area.

2. The projection device of claim 1, wherein to determine the boundary of the projection region comprises to perform, using a camera of the projection device, a depth scan to identify the projection region in a field of view of the projector of the projection device.

3. The projection device of claim 1, further comprising to adjust the boundary of the projection region, wherein adjusting the boundary of the projection region comprises to (i) perform a scan to detect one or more boundary defining objects, (ii) identify a location of each of the one or more boundary defining objects, wherein each location identifies a point along a new boundary of the projection region, and (iii) adjust the boundary of the projection region based on each of the identified locations.

4. The projection device of claim 1, wherein to determine the at least one cut-out area of the projection region comprises to (i) perform a scan to detect one or more boundary defining objects, (ii) identify a location of each of the one or more boundary defining objects, wherein each location identifies a point along the cut-out area, and (iii) generate the cut-out area based on each of the identified locations.

5. The projection device of claim 1, wherein to not project the portion of the projection region that corresponds to the cut-out area comprises to emit substantially no light from the projector onto the cut-out area of the projection region.

6. The projection device of claim 1, further comprising an action area determination module to (i) determine an action area of the projection region, wherein the action area defines an area within the projection region on which the image is to be projected by the projector of the projection device in response to a determination that a function associated with the action area is triggered, (ii) perform a scan to determine an action area boundary of the action area, wherein the action area boundary of the action area defines at least one of the size and shape of the action area, (iii) determine the action area boundary of the action area based on the scan, (iv) create an action area based on the determined action area boundary of the action area, and (v) store data identifying the action area.

7. The projection device of claim 6, wherein the action area determination module is further to (i) determine the function to associate with the action area, (ii) determine one or more settings of the function, wherein the one or more settings include one or more environment conditions of an environment of the projection region, and wherein the environment conditions define a trigger that, when satisfied, cause the projection device to perform the function, and (iii) store the function of the action area and the one or more settings of the function.

8. The projection device of claim 7, wherein to determine the one or more environment conditions comprises to monitor one or more sensors of the projection device to detect the environment conditions.

9. The projection device of claim 8, further comprising an action area function performance module to perform an action based on a determination that the function associated with the action area is triggered, wherein the action comprises at least one of projecting the image onto the action area and playing back an audio file during at least a portion of the image projection.

10. The projection device of claim 1, wherein the projection management module is further to (i) determine one or more settings of the projector based on the updated projection region and (ii) calibrate the projector based on the one or more projector settings.

11. The projection device of claim 10, wherein the projection management module is further to (i) adjust the image to be projected based on the updated projection region and (ii) project the adjusted image onto the updated projection region.

12. One or more non-transitory, computer-readable storage media comprising a plurality of instructions stored thereon that in response to being executed cause a projection device to:

determine a boundary of a projection region, wherein the projection region defines a region on which an image is to be projected by a projector of the projection device;

determine at least one cut-out area of the projection region, wherein the at least one cut-out area defines an area within the projection region on which a corresponding portion of the image is not to be projected by the projector of the projection device;

generate an updated projection region based on the determined boundary of the projection region and the determined at least one cut-out area; and project, by the projector, the image onto the updated projection region, wherein no portion of the image is projected on the at least one cut-out area.

13. The one or more non-transitory, computer-readable storage media of claim 12, wherein to determine the boundary of the projection region comprises to perform, using a camera of the projection device, a depth scan to identify the projection region in a field of view of the projector of the projection device.

14. The one or more non-transitory, computer-readable storage media of claim 12, further comprising a plurality of instructions that in response to being executed cause the projection device to adjust the boundary of the projection region, wherein to adjust the boundary of the projection region comprises to (i) perform a scan to detect one or more boundary defining objects, (ii) identify a location of each of the one or more boundary defining objects, wherein each location identifies a point along a new boundary of the projection region, and (iii) adjust the boundary of the projection region based on each of the identified locations.

15. The one or more non-transitory, computer-readable storage media of claim 12, wherein to determine the at least one cut-out area of the projection region comprises to (i) perform a scan to detect one or more boundary defining objects, (ii) identify a location of each of the one or more boundary defining objects, wherein each location identifies a point along a cut-out area, and (iii) generate the cut-out area based on each of the identified locations.

16. The one or more non-transitory, computer-readable storage media of claim 12, wherein to not project the portion of the projection region that corresponds to the cut-out area comprises emitting substantially no light from the projector onto the cut-out area of the projection region.

17. The one or more non-transitory, computer-readable storage media of claim 12, further comprising a plurality of instructions that in response to being executed cause the projection device to:
determine an action area of the projection region, wherein the action area defines an area within the projection region on which the image is to be projected by the projector of the projection device in response to a determination that a function associated with the action area is triggered;
perform a scan to determine an action area boundary of the action area, wherein the action area boundary of the action area defines at least one of the size and shape of the action area;
determine the action area boundary of the action area based on the scan;
create an action area based on the determined action area boundary of the action area; and
store data identifying the action area.

18. The one or more non-transitory, computer-readable storage media of claim 17, further comprising a plurality of instructions that in response to being executed cause the projection device to:
determine the function to associate with the action area;
determine one or more settings of the function, wherein the one or more settings include one or more environment conditions of an environment of the projection region, and wherein the environment conditions define a trigger that, when satisfied, cause the projection device to perform the function; and
store the function of the action area and the one or more settings of the function.

19. The one or more non-transitory, computer-readable storage media of claim 18, wherein to determine the one or more environment conditions comprises to monitor one or more sensors of the projection device to detect the environment conditions.

20. The one or more non-transitory, computer-readable storage media of claim 19, further comprising a plurality of instructions that in response to being executed cause the projection device to perform an action based on a determination that the function associated with the action area is triggered, wherein the action comprises at least one of to project the image onto the action area and playback an audio file during at least a portion of the image projection.

21. The one or more non-transitory, computer-readable storage media of claim 12, further comprising a plurality of instructions that in response to being executed cause the projection device to:
determine one or more settings of the projector based on the updated projection region; and
calibrate the projector based on the one or more projector settings.

22. The one or more non-transitory, computer-readable storage media of claim 21, further comprising a plurality of instructions that in response to being executed cause the projection device to:
adjust the image to be projected based on the updated projection region; and
project the adjusted image onto the updated projection region.

23. A method for projecting a noncontinuous image, the method comprising:
determining, by a projection device, a boundary of a projection region, wherein the projection region defines a region on which an image is to be projected by a projector of the projection device;
determining, by the projection device, at least one cut-out area of the projection region, wherein the at least one cut-out area defines an area within the projection region on which a corresponding portion of the image is not to be projected by the projector of the projection device;
generating, by the projection device, an updated projection region based on the determined boundary of the projection region and the determined at least one cut-out area; and
projecting, by the projector of the projection device, the image onto the updated projection region, wherein no portion of the image is projected on the at least one cut-out area.

24. The method of claim 23, further comprising adjusting the boundary of the projection region, wherein adjusting the boundary of the projection region comprises (i) performing a scan to detect one or more boundary defining objects, (ii) identifying a location of each of the one or more boundary defining objects, wherein each location identifies a point along a new boundary of the projection region, and (iii) adjusting the boundary of the projection region based on each of the identified locations.

25. The method of claim 23, wherein determining the at least one cut-out area of the projection region comprises (i) performing a scan to detect one or more boundary defining objects, (ii) identifying a location of each of the one or more boundary defining objects, wherein each location identifies a point along a cut-out area, and (iii) generating the cut-out area based on each of the identified locations.

* * * * *